US012586365B2

(12) United States Patent
Shen et al.

(10) Patent No.: US 12,586,365 B2
(45) Date of Patent: Mar. 24, 2026

(54) OBJECT CLASSIFICATION USING MULTIPLE LABELS FOR AUTONOMOUS SYSTEMS AND APPLICATIONS

(71) Applicant: NVIDIA Corporation, Santa Clara, CA (US)

(72) Inventors: Rui Shen, San Jose, CA (US); Sebastian Michael Agethen, Mountain View, CA (US); Jian xing Zhang, North York (CA)

(73) Assignee: NVIDIA Corporation, Santa Clara, CA (US)

( * ) Notice: Subject to any disclaimer, the term of this patent is extended or adjusted under 35 U.S.C. 154(b) by 411 days.

(21) Appl. No.: 18/322,940

(22) Filed: May 24, 2023

(65) Prior Publication Data

US 2024/0395027 A1 Nov. 28, 2024

(51) Int. Cl.
*G06V 10/82* (2022.01)
*G06N 3/045* (2023.01)
(Continued)

(52) U.S. Cl.
CPC ............. *G06V 10/82* (2022.01); *G06N 3/045* (2023.01); *G06N 3/084* (2013.01); *G06V 20/60* (2022.01)

(58) Field of Classification Search
CPC .......... G06N 3/045; G06N 3/08; G06N 3/084; G06V 10/764; G06V 10/82; G06V 20/582; G06V 20/60
See application file for complete search history.

(56) References Cited

U.S. PATENT DOCUMENTS 9,747,527 B2 8/2017 Baranowski et al.
11,195,331 B2 12/2021 Lee et al.
(Continued)

FOREIGN PATENT DOCUMENTS

GB 2597266 A * 1/2022 ............... G06T 7/73
WO WO-2018218149 A1 * 11/2018 ............... G06F 8/65
WO WO-2021138357 A1 * 7/2021 ............. G06V 20/56

OTHER PUBLICATIONS

Hamed Habibi Aghdam et al. ,"A practical approach for detection and classification of traffic signs using Convolutional Neural Networks," Jul. 19, 2016, Robotics and Autonomous Systems 84 (2016), pp. 96-107.*
Prabu Subramani et al., "Multi-Classifier Feature Fusion-Based Road Detection for Connected Autonomous Vehicles," Aug. 29, 2021, Applied Sciences ,2021, 11,7984,,pp. 1-14.*
(Continued)

*Primary Examiner* — Omar S Ismail
(74) *Attorney, Agent, or Firm* — IRON SUMMIT IP LLP

(57) ABSTRACT

In various examples, multilabel hierarchical classification of objects for autonomous systems and applications is described herein. Systems and methods are disclosed that use one or more neural networks to classify objects, such as traffic signs, using multilabel classification and/or hierarchical classification. For instance, a multilabel subnetwork of the neural network(s) may classify an object based at least on one or more attributes associated with the object. As such, the output from the multilabel subnetwork may include at least a classification associated with the object and an attribute classification(s) associated with the object. A hierarchical subnetwork of the neural network(s) may also classify the object using one or more class labels, where a class label indicates another classification and/or a class group associated with the object. The systems and methods may then use the classification, the attribute classification(s), and/or the class label(s) to determine a final classification associated with the object.

20 Claims, 16 Drawing Sheets

(51) Int. Cl.
 G06N 3/084  (2023.01)
 G06V 20/60  (2022.01)

(56) References Cited

U.S. PATENT DOCUMENTS

| 11,210,537 | B2 | 12/2021 | Koivisto et al. | |
| 11,468,582 | B2 | 10/2022 | Yoo et al. | |
| 2019/0318099 | A1* | 10/2019 | Carvalho | G06F 21/577 |
| 2020/0210721 | A1* | 7/2020 | Goel | G06N 3/04 |
| 2021/0004613 | A1* | 1/2021 | Yang | G06V 20/56 |
| 2021/0012116 | A1* | 1/2021 | Urtasun | G06N 3/09 |
| 2021/0063578 | A1 | 3/2021 | Wekel et al. | |
| 2021/0380125 | A1* | 12/2021 | Hernandez Esteban | G06T 7/77 |
| 2021/0381843 | A1* | 12/2021 | Montemerlo | G05D 1/0285 |
| 2022/0063662 | A1* | 3/2022 | Sprunk | G06V 20/58 |
| 2022/0076030 | A1* | 3/2022 | Anguelov | G06F 18/251 |
| 2022/0083073 | A1* | 3/2022 | Silver | G06V 20/56 |
| 2022/0097726 | A1* | 3/2022 | Buchanan | B60W 30/0956 |
| 2022/0097731 | A1* | 3/2022 | Xu | G01C 21/3602 |
| 2022/0204019 | A1* | 6/2022 | Lauterbach | G06T 15/205 |
| 2022/0261593 | A1* | 8/2022 | Yu | G06F 18/214 |
| 2023/0016568 | A1 | 1/2023 | Sriram et al. | |
| 2023/0091396 | A1* | 3/2023 | Khoreva | G06V 10/774 |
| | | | | 382/157 |
| 2024/0005641 | A1* | 1/2024 | Bhatia | G06N 3/096 |

OTHER PUBLICATIONS

Radu Timofte et al., "Multi-view traffic sign detection, recognition, and 3D localisation," Dec. 30, 2011, Machine Vision and Applications (2014) 25, pp. 633-645.*

Hee Seok Lee et al., "Simultaneous Traffic Sign Detection and Boundary Estimation Using Convolutional Neural Network," May 2, 2018, IEEE Transactions on Intelligent Transportation Systems, vol. 19, No. 5, May 2018, pp. 1652-1662.*

Jihene Rezgui et al., "Traffic Sign Recognition Using Neural Networks Useful for Autonomous Vehicles," Apr. 20, 2020, 2019 International Conference on Smart Applications, Communications and Networking (SmartNets), pp. 1-5.*

Hengliang Luo et al., "Traffic Sign Recognition Using a Multi-Task Convolutional Neural Network," Jun. 27, 2017, IEEE Transactions on Intelligent Transportation Systems, vol. 19, No. 4, Apr. 2018,pp. 1100-1108.*

Sharifah Maryam Alhabshee et al., "Deep Learning Traffic Sign Recognition in Autonomous Vehicle," Nov. 12, 2020,2020 IEEE Student Conference on Research and Development (SCOReD) Sep. 27-28, 2020, Johor, Malaysia, pp. 438-442.*

Chaoquan Zhang et al.,"Automated detecting and placing road objects from street-level images," Aug. 4, 2021, Computational Urban Science, pp. 1-15.*

* cited by examiner

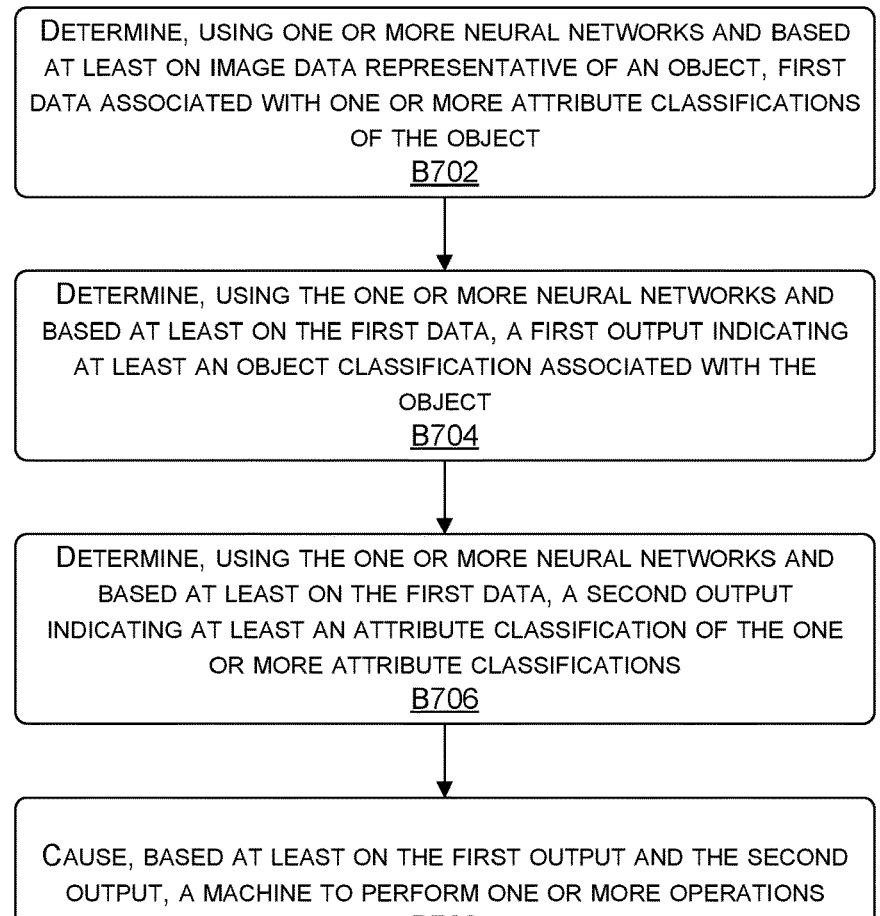

DETERMINE, USING ONE OR MORE NEURAL NETWORKS AND BASED AT LEAST ON IMAGE DATA REPRESENTATIVE OF AN OBJECT, FIRST DATA ASSOCIATED WITH ONE OR MORE ATTRIBUTE CLASSIFICATIONS OF THE OBJECT
B702

DETERMINE, USING THE ONE OR MORE NEURAL NETWORKS AND BASED AT LEAST ON THE FIRST DATA, A FIRST OUTPUT INDICATING AT LEAST AN OBJECT CLASSIFICATION ASSOCIATED WITH THE OBJECT
B704

DETERMINE, USING THE ONE OR MORE NEURAL NETWORKS AND BASED AT LEAST ON THE FIRST DATA, A SECOND OUTPUT INDICATING AT LEAST AN ATTRIBUTE CLASSIFICATION OF THE ONE OR MORE ATTRIBUTE CLASSIFICATIONS
B706

CAUSE, BASED AT LEAST ON THE FIRST OUTPUT AND THE SECOND OUTPUT, A MACHINE TO PERFORM ONE OR MORE OPERATIONS
B708

FIGURE 7

800

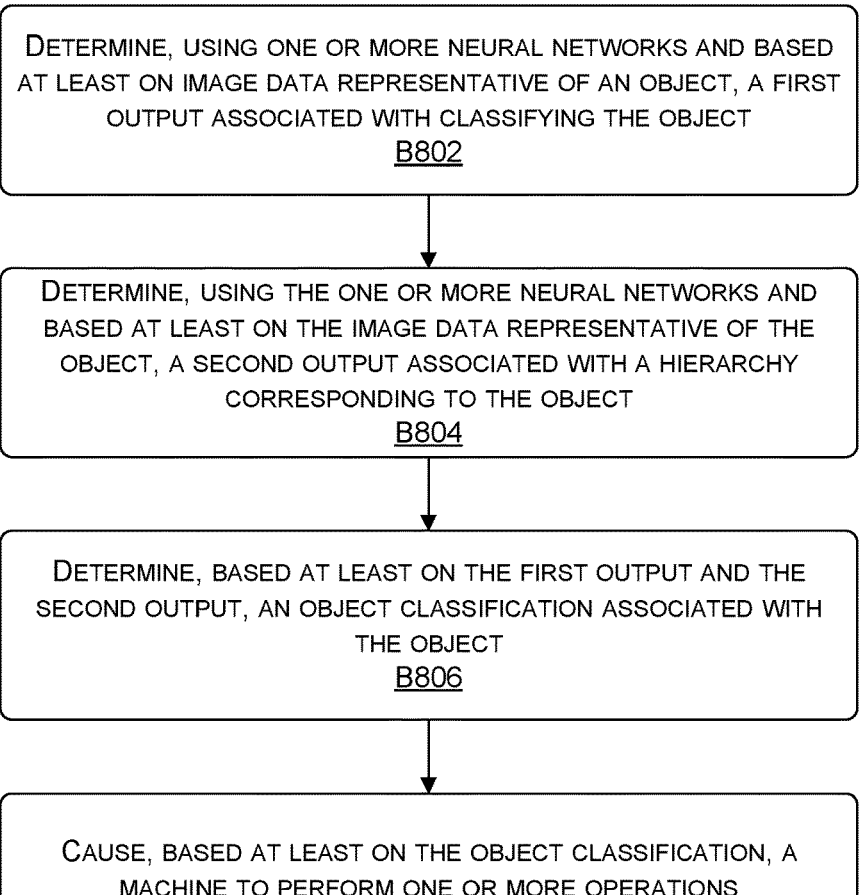

DETERMINE, USING ONE OR MORE NEURAL NETWORKS AND BASED AT LEAST ON IMAGE DATA REPRESENTATIVE OF AN OBJECT, A FIRST OUTPUT ASSOCIATED WITH CLASSIFYING THE OBJECT
B802

DETERMINE, USING THE ONE OR MORE NEURAL NETWORKS AND BASED AT LEAST ON THE IMAGE DATA REPRESENTATIVE OF THE OBJECT, A SECOND OUTPUT ASSOCIATED WITH A HIERARCHY CORRESPONDING TO THE OBJECT
B804

DETERMINE, BASED AT LEAST ON THE FIRST OUTPUT AND THE SECOND OUTPUT, AN OBJECT CLASSIFICATION ASSOCIATED WITH THE OBJECT
B806

CAUSE, BASED AT LEAST ON THE OBJECT CLASSIFICATION, A MACHINE TO PERFORM ONE OR MORE OPERATIONS
B808

FIGURE 8

SERVER(s) 978

CPU 980(B)

PCIE SWITCH 982(D)

PCIE SWITCH 982(C)

GPU 984(F)

GPU 984(H)

GPU 984(E)

GPU 984(G)

CPU 980(A)

PCIE SWITCH 982(B)

PCIE SWITCH 982(A)

GPU 984(B)

GPU 984(D)

GPU 984(A)

GPU 984(C)

986

988

976

900

994

992

NETWORK(S) 990

1000

MEMORY
1004

I/O COMPONENTS
1014

CPU(s)
1006

POWER SUPPLY
1016

GPU(s)
1008

PRESENTATION
COMPONENT(S)
1018

COMM. INTERFACE
1010

LOGIC UNIT(S)
1020

I/O PORT(S)
1012

1002

1100

OBJECT CLASSIFICATION USING MULTIPLE LABELS FOR AUTONOMOUS SYSTEMS AND APPLICATIONS

BACKGROUND

Vehicles or machines (e.g., autonomous vehicles or machines, semi-autonomous vehicles or machines, etc.) may use image sensors, such as cameras, to perceive environments surrounding the vehicles. For instance, a vehicle may use one or more neural networks to process image data generated using one or more image sensors in order to determine information associated with objects surrounding the vehicle. In some circumstances, the information may include classifications associated with the objects. For example, if an object includes a traffic sign, the classification associated with the traffic sign may include a stop sign, a yield sign, a school zone sign, a speed limit sign, a speed limit 50 miles per hour (MPH) sign, a speed limit 60 MPH sign, and/or any other type of traffic sign. The vehicle may then use the information associated with the objects to determine how to navigate within the environment. For example, if the object includes a stop sign, the vehicle may determine to stop before reaching a location that is associated with the stop sign.

Since environments may include large numbers of different types of objects, such as thousands of types of traffic signs, the vehicles need to be capable of classifying the objects in order to navigate within the environments. As such, various techniques have been developed for classifying traffic signs. For example, a flat classification technique uses a neural network that directly classifies a traffic sign depicted by an image into a traffic sign classification. For instance, if the image depicts a stop sign, then the neural network may directly output data indicating that the traffic sign depicted by the image is a stop sign. As such, in order for flat classification to be able to classify a type of street sign, the neural network may need to directly distinguish the classification against each of the other classifications associated with traffic signs. Because of this, the neural network may need to be trained using a large training set, where the large training set includes multiple (e.g., hundreds, thousands, etc.) of training samples for each type of classification.

For another example, a hierarchical classification technique arranges traffic sign classes into a hierarchy and then classifies an image into a parent class and/or one or more child classes. For instance, if an image depicts a speed limit 50 MPH sign, a neural network may initially classify the image into a speed limit class, then classify the image into a rectangular speed limit class, and finally classify the image into a rectangular speed limit 50 MPH class. However, and similar to the flat classification technique, the hierarchical classification technique may also be limited by scalability. For instance, each of the child classifications may require a large number of training samples in order to train the neural network to be capable of classifying images associated with the respective child classification. As such, training the neural network for all of the traffic sign classifications may again require a large training set and thus a high compute cost.

SUMMARY

Embodiments of the present disclosure relate to multilabel hierarchical classification of objects for autonomous and semi-autonomous systems and applications. Systems and methods are disclosed that use one or more neural networks to classify objects, such as traffic signs, using multilabel classification and/or hierarchical classification. For instance, a multilabel subnetwork of the neural network(s) may classify an object based at least on one or more attributes associated with the object. As such, the output from the multilabel subnetwork may include at least a classification associated with the object and an attribute classification(s) associated with the object. A hierarchical subnetwork of the neural network(s) may also classify the object using one or more class labels, where a class label indicates another classification and/or a class group associated with the object. The systems and methods may then use the classification, the attribute classification(s), and/or the class label(s) to determine a final classification associated with the object.

In contrast to conventional systems, such as conventional systems that perform one or more of the techniques above, the current systems, in some examples, are able to classify an object, such as a traffic sign, even when there was no and/or little data for training the neural network(s) for the object. As described in more detail herein, the current systems are able to classify such an object—e.g., using few shot or zero-shot learning—since the neural network(s) is trained to classify other objects that share one or more of the same attribute classifications as the classified object, which may mean that the other objects are at least partially related to the classified object. Additionally, and for similar reasons, the neural network(s) may be trained using less training data as compared to the conventional systems. Because of this, the current systems may be more data efficient and/or require less time and compute when classifying objects depicted by or represented by images or other sensor data representations (e.g., point clouds, range images, projection images, top-down images, etc.).

BRIEF DESCRIPTION OF THE DRAWINGS

The present systems and methods for multilabel hierarchical classification of objects for autonomous and semi-autonomous systems and applications are described in detail below with reference to the attached drawing figures, wherein:

FIG. 1 illustrates an example data flow diagram for a process of using one or more neural networks to classify objects, in accordance with some embodiments of the present disclosure;

FIG. 5 is a data flow diagram illustrating a process for training the neural network(s) associated with the example of FIG. 1, in accordance with some embodiments of the present disclosure;

FIG. 7 illustrates a flow diagram showing a method for using one or more neural networks to determine an object classification and an attribute classification associated with an object, in accordance with some embodiments of the present disclosure;

FIG. 8 illustrates a flow diagram showing a method for using one or more neural networks to classify an object, in accordance with some embodiments of the present disclosure;

DETAILED DESCRIPTION

Figure 2:
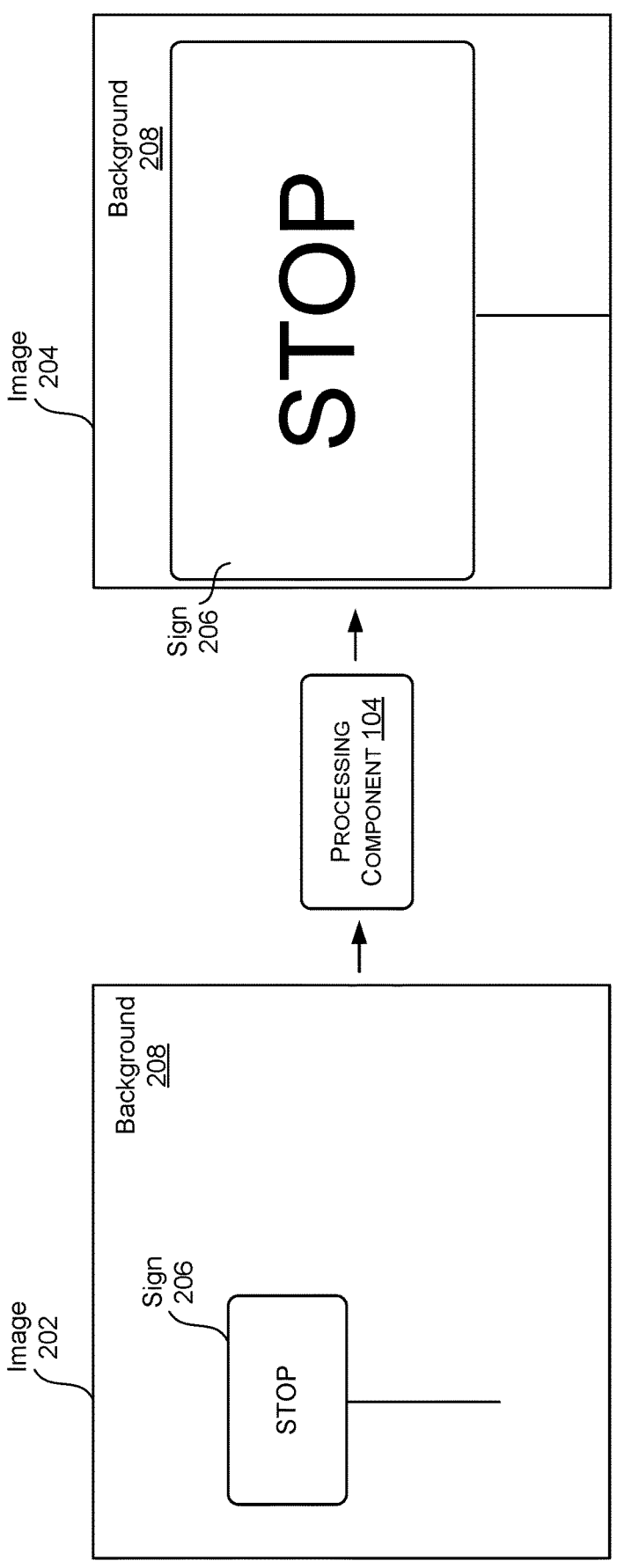
FIG. 2 illustrates an example of processing an image in order to generate a processed image, in accordance with some embodiments of the present disclosure.

Systems and methods are disclosed related to multilabel hierarchical classification of objects for autonomous systems and applications. Although the present disclosure may be described with respect to an example autonomous or semi-autonomous vehicle or machine 900 (alternatively referred to herein as "vehicle 900" or "ego-machine 900," an example of which is described with respect to FIGS. 9A-9D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to classifications in autonomous or semi-autonomous machine applications, this is not intended to be limiting, and the systems and methods described herein may be used in augmented reality, virtual reality, mixed reality, robotics, security and surveillance, autonomous or semi-autonomous machine applications, and/or any other technology spaces where sign classifications may be used.

For instance, a system(s) may receive image data (and/or other sensor data types, such as LiDAR data, RADAR data, etc.) generated using one or more image sensors (and/or other sensors, such as LiDAR sensors, RADAR sensors, etc.) of a vehicle, where the image data represents one or more images (and/or other sensor data representations, such as point clouds, range images, etc.) depicting an object. As described herein, an object may include, but is not limited to, a traffic sign, a vehicle, a structure, a pedestrian, an animal, a surface (e.g., a road, a driveway, a parking lot, etc.), a road feature (e.g., a painted decal or feature on a roadway or other path), and/or any other type of object. In some examples, the system(s) may then process the image data using one or more image processing techniques. For instance, the system(s) may process the image data using one or more image cropping techniques in order to generate updated image data representing one or more cropped images that depict a larger or more focused representation of the object—with less background around the object depicted or represented.

The system(s) may then process the image data (and/or the updated image data) using one or more neural networks that are trained to classify objects, such as traffic signs, using multilabel classification and/or hierarchical classification. For instance, and as described herein, a first subnetwork of the neural network(s), which may be referred to as a multilabel subnetwork of the neural network(s), may be configured to process the image data in order to generate a first output. In some examples, the first output may include at least an object classification associated with the object and/or one or more attribute classifications associated with the object. Additionally, or alternatively, a second subnetwork of the neural network(s), which may be referred to as a hierarchical subnetwork of the neural network(s), may be configured to process the image data in order to generate a second output. In some examples, the second output may include a class label associated with the object, where the class label includes a class group associated with the object and/or another object classification associated with the object.

For more detail, the first subnetwork of the neural network(s) may include a number of different layers. In some examples, the layers may include, but are not limited to, one or more layers associated with a backbone that is configured to generate one or more shared feature vectors associated with the image data, one or more layers associated with one or more attribute feature extractors that are configured to generate one or more attribute feature vectors associated with the object, one or more layers associated with one or more attribute classification heads that are configured to output one or more probability vectors associated with the attribute classification(s) corresponding to the object, and/or one or more layers associated with one or more object classification heads that are configured to output one or more probability vectors associated with one or more object classifications corresponding to the object. However, in other examples, the first subnetwork may include one or more additional and/or alternative layers.

The first subnetwork of the neural network(s) and/or one or more additional processing components may then use the probability vector(s) associated with the attribute classification(s) to determine the final attribute classification(s) associated with the object. As described herein, an attribute classification may be associated with an attribute type such as, but not limited to, a shape of the object, a color of the object, text associated with the object, a graphic associated with the object, a size of the object, and/or any other type of attribute associate with objects. The first subnetwork of the neural network(s) and/or the additional processing component(s) may also use the probability vector(s) associated with the object classification(s) to determine an object classification associated with the object. As described herein, an object classification may include, but is not limited to, pedestrian, vehicle (and/or type of vehicle, such as car, truck, van, motorcycle, etc.), animal (and/or type of animal, such as dog, cat, bird, etc.), traffic sign (and/or type of traffic sign described herein), and/or any other types of classification associated with objects. For example, and if the image depicts a traffic sign, the sign classification may include, but is not limited to, stop sign, crosswalk sign, school zone sign, yield sign, speed limit sign, speed limit 25 miles per hour (MPH) sign, speed limit 50 MPH sign, speed limit 60 MPH sign, circular speed limit 60 MPH sign, rectangular speed limit 60 MPH sign, a painted surface decal or feature, and/or any other type of traffic sign.

The second subnetwork of the neural network(s) may also include a number of different layers. In some examples, the layers may include, but are not limited to, the one or more layers associated with the backbone that is configured to generate the one or more shared feature vectors associated with the image data, one or more layers associated with one or more hierarchical classification feature extractors that are configured to output one or more classification feature vectors, and/or one or more layers associated with one or more hierarchical classification heads that are configured to output one or more probability vectors associated with one or more class labels (e.g., one or more object classifications, one or more classification groups, etc.) corresponding to the object. For instance, and as described herein, the class labels may be oriented in a hierarchy, where a first level includes one or more first class groups, a second level includes one or more second class groups (e.g., one or more child class groups) and/or one or more first object classifications associated with the first class group(s), a third level includes one or more third class groups (e.g., one or more child groups) and/or one or more second object classifications associated with the second class group(s), and/or so forth.

The second subnetwork of the neural network and/or the additional processing component(s) may then use the probability vector(s) associated with the class label(s) to determine a final class label associated with the object. As described herein, the final class label may include a class group and/or another object classification associated with the object.

The system(s) (e.g., the neural network(s)) may then perform one or more techniques to determine a final object classification associated with the object. For a first example, if the system(s) determines that the class label includes an object classification, and the object classification is associated with a probability that satisfies (e.g., is equal to or greater than) a threshold probability, then the system(s) may select the object classification to include the final object classification associated with the object. For a second example, if the system(s) determines that the class label includes a class group, then the system(s) may select the object classification that is within the class group and is associated with a highest probability represented by the probability vector(s) output by the first subnetwork. Still, for a third example, if the system(s) determines that an object classification is associated with a highest probability represented by the probability vector(s) output by the first subnetwork, and the highest probability satisfies (e.g., is equal to or greater than) a threshold probability, then the system(s) may select the object classification to include the final object classification associated with the object. While these are just three example techniques of how the system(s) may use the output(s) from the neural network(s) to determine the final object classification associated with the object, in other examples, the system(s) may use additional and/or alternative techniques.

In order to train the neural network(s), the system(s) may use a dataset of images depicting objects and corresponding ground truth data. As described herein, the dataset of images may include one or more images for one or more types of objects (e.g., each type of object) for which the neural network(s) is being trained. Additionally, the ground truth data for an image may represent an object classification of the object, one or more attribute classifications associated with the object, and/or a class label associated with the object. The system(s) may also use one or more techniques in order to train the neural network(s). For a first example, if the ground truth data is associated with the first subnetwork (e.g., represents object classifications and attribute classifications associated with the objects), then the system(s) may determine losses for the first subnetwork and/or losses for the second subnetwork and then use the losses to backpropagate gradients through at least a portion of (e.g., an entirety of) the neural network(s). For a second example, if the ground truth data is not associated with the first subnetwork (e.g., represent object classification but does not represent attribute classifications associated with the objects), then the system(s) may only determine losses associated with the second subnetwork and use the losses to backpropagate gradients through at least a portion of the second subnetwork (e.g., the entire second subnetwork including the backbone).

In some examples, the system(s) may use one or more stop-gradient layers when training the neural network(s). For example, the system(s) may add a stop-gradient layer between the layer(s) associated with the attribute feature extractor(s) and the layer(s) associated with the sign classification head(s) in order to stop backpropagating the gradients associated with the losses of the sign classification head(s) through the rest of the neural network(s). In some examples, the system(s) may continue to train the neural network(s) until one or more events occur. For example, the system(s) may continue to train the neural network(s) until a total loss associated with the neural network(s) is less than a threshold loss, an accuracy on a validation dataset is greater than a threshold accuracy, and/or a pre-defined number of training epochs is reached.

The systems and methods described herein may be used by, without limitation, non-autonomous vehicles, semi-autonomous vehicles (e.g., in one or more adaptive driver assistance systems (ADAS)), autonomous vehicles, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems implementing one or more language models, such as one or more large language models (LLMs) that may process audio, textual, sensor, and/or image data, systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Figure 1:
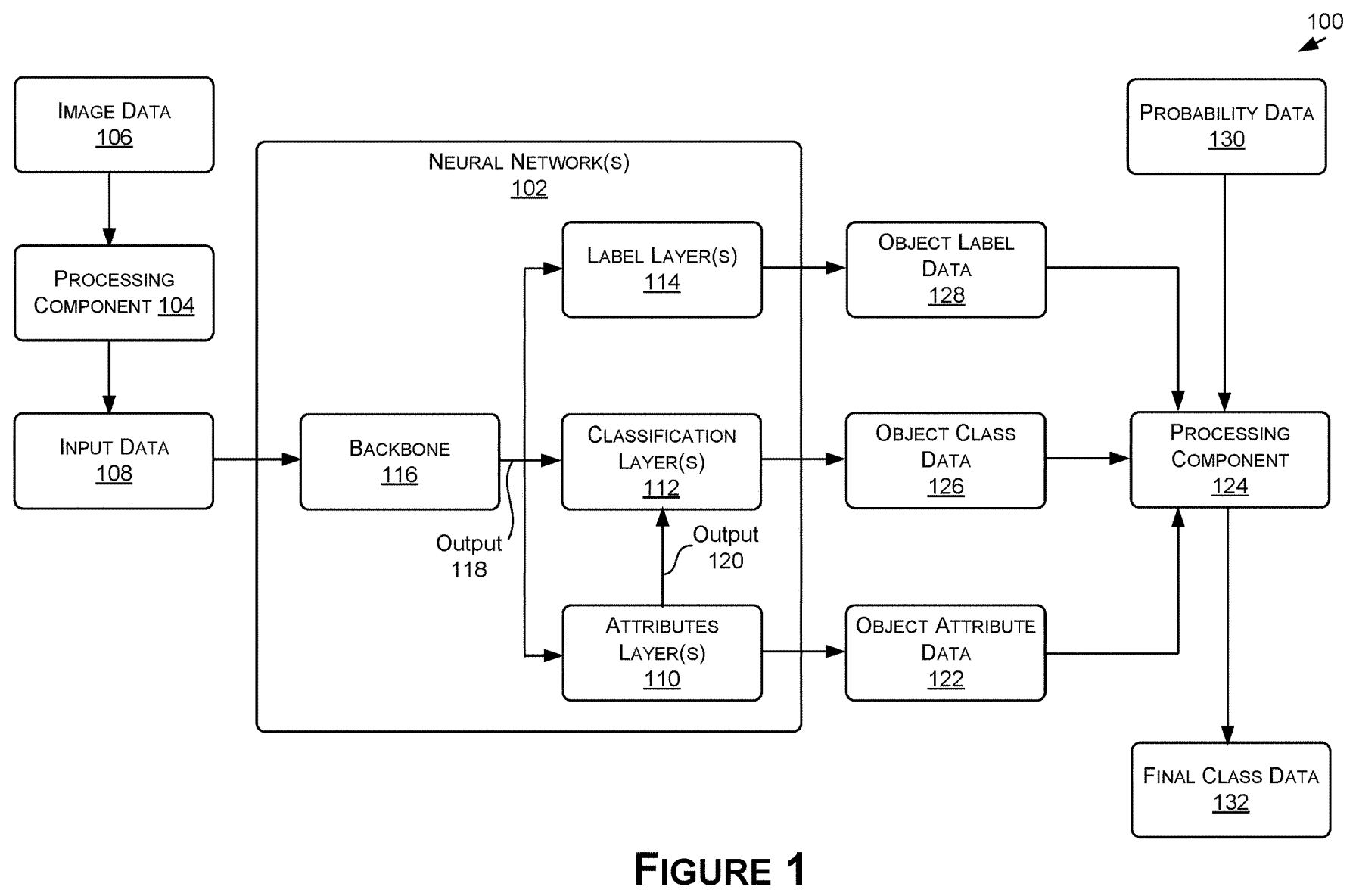

With reference to FIG. 1, FIG. 1 illustrates an example data flow diagram for a process 100 of using one or more neural networks 102 to classify an object, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous or semi-autonomous vehicle or machine 900 of FIGS. 9A-9D, example computing device 1000 of FIG. 10, and/or example data center 1100 of FIG. 11.

The process 100 may include a processing component 104 processing image data 106 using one or more techniques in order to generate input data 108. As described herein, the image data 106 may represent one or more images depicting one or more objects. For example, and for an image represented by the image data 106, the processing component 104 may process the image using one or more image cropping techniques in order to remove one or more portions of the image that depict a background and/or objects other than the object of interest. For instance, if an image depicts a traffic sign, where the traffic sign is the object of interest, then the processing component 104 may process the image in order to remove portions of the image that do not depict the traffic sign. This way, a greater portion of the processed image, which is represented by the input data 108, depicts the traffic sign as compared to the original image.

For instance, FIG. 2 illustrates an example of processing an image 202 in order to generate a processed image 204, in accordance with some embodiments of the present disclosure. As shown, the image 202 may depict at least a traffic sign 206 (e.g., the object of interest) and a background 208 surrounding the traffic sign 206. The processing component 104 may then process the image 202 using the one or more image cropping techniques in order to generate the processed image 204. As shown by the example of FIG. 2, a greater portion of the processed image 204 depicts the traffic sign 206 as compared to the image 202. Additionally, the processing component 104 generates the processed image 204 to depict at least a portion of interest of the traffic sign 206, such as the portion that includes information on how vehicles should navigate.

Referring back to the example of FIG. 1, the process 100 may include the neural network(s) 102 processing the input data 108 (and/or, in some examples, the image data 106) in order to classify an object represented by the input data 108. As described herein, in some examples, the neural network(s) 102 may use multilabel classification and/or hierarchical classification to classify the object. For instance, a first subnetwork of the neural network(s) 102, which may be referred to as a multilabel subnetwork, may include at least one or more attribute layers 110 and/or one or more classification layers 112. Additionally, a second subnetwork of the neural network(s) 102, which may be referred to as a hierarchical subnetwork, may include one or more object label layers 114. Additionally, and as further illustrated by the example of FIG. 1, the neural network(s) 102 may include a backbone 116 that is shared between the first subnetwork and the second subnetwork of the neural network(s) 102.

For instance, the backbone 116 may process the input data 108 and, based at least on the processing, output data 118. In some examples, the output data 118 may represent one or more feature vectors associated with the input data 108. A first portion of the attribute layer(s) 110 may then process the output data 118 from the backbone 116 and, based at least on the processing, output data 120. In some examples, the output data 120 may represent one or more feature vectors associated with the attribute classification(s) of the object. For example, if the neural network(s) 102 is configured to determine three different attribute types, the output data 120 may represent a first feature vector(s) associated with the first attribute type, a second feature vector(s) associated with the second attribute type, and a third feature vector(s) associated with the third attribute type.

A second portion of the attribute layer(s) 110 may also process the output data 120 and, based at least on the processing, output object attribute data 122. In some examples, the object attribute data 122 may represent one or more attribute classifications associated with the object. For example, the object attribute data 122 may represent a first attribute classification associated with a first attribute type, a second attribute classification associated with a second attribute type, a third attribute classification associated with a third attribute type, and/or so forth. As described herein, an attribute type may include, but is not limited to, shapes, colors, text, graphics, sizes, and/or any other type of attribute associated with objects. Additionally, an attribute classification may include information associated with the attribute type. For a first example, an attribute classification associated with the attribute type shapes may include, but is not limited to, circle, triangle, rectangle, hexagon, octagon, and/or any other shape. For a second example, an attribute classification associated with the attribute type color may include, but is not limited to, white, black, yellow, red, and/or any other color.

Additionally, or alternatively, in some examples, the object attribute data 122 may represent one or more probabilities (e.g., one or more probability vectors) associated with one or more attribute classifications. For example, and for an attribute type, the object attribute data 122 may represent a first probability that the attribute type includes a first attribute classification, a second probability that the attribute type includes a second attribute classification, a third probability that the attribute type includes a third attribute classification, and/or so forth. For instance, if an attribute type includes shapes, then the object attribute data 122 may represent a first probability associated with a circle, a second probability associated with a square, a third probability associated with a rectangle, and/or so forth. As will be described in more detail herein, a processing component 124 may then use the probabilities to determine the final attribute classification(s) associated with the object.

The classification layer(s) 112 may also process the output data 120 and, based at least on the processing, output object class data 126. In some examples, the object class data 126 may represent an object classification associated with the object. For example, if the object is a traffic sign, then the object class data 126 may represent the type of traffic sign such as, but not limited to, stop sign, crosswalk sign, school zone sign, speed limit sign, speed limit 25 miles per hour (MPH) sign, speed limit 50 MPH sign, speed limit 60 MPH sign, and/or any other type of traffic sign. Additionally, or alternatively, in some examples, the object class data 126 may represent one or more probabilities (e.g., one or more probability vectors) associated with one or more object classifications. For example, the object class data 126 may represent a first probability associated with a first object classification (e.g., stop sign), a second probability associated with a second object classification (e.g., speed limit 50 MPH sign), a third probability associated with a third object classification (e.g., speed limit 75 MPH sign), and/or so forth. As will be described in more detail here, the processing component 124 may then use the probabilities to determine a final object classification associated with the object.

The object label layer(s) 114 may process the output data 118 from the backbone 116 and, based at least on the processing, output label data 128. In some examples, the output label data 128 may represent a class label, such as a class group associated with the object and/or an object classification associated with the object, which is described in more detail herein. Additionally, or alternatively, in some examples, the object label data 128 may represent one or more probabilities (e.g., one or more probability vectors) associated with one or more class labels. For example, the object label data 126 may represent a first probability associated with a first class group, a second probability associated with a second class group, a third probability associated with a third class group, a fourth probability associated with a first object classification, a fifth probability associated with a second object classification, and/or so forth. As will be described in more detail here, the processing component 124 may then use the probabilities to determine a final class label, such as a final class group and/or a final object classification associated with the object.

Figure 3:
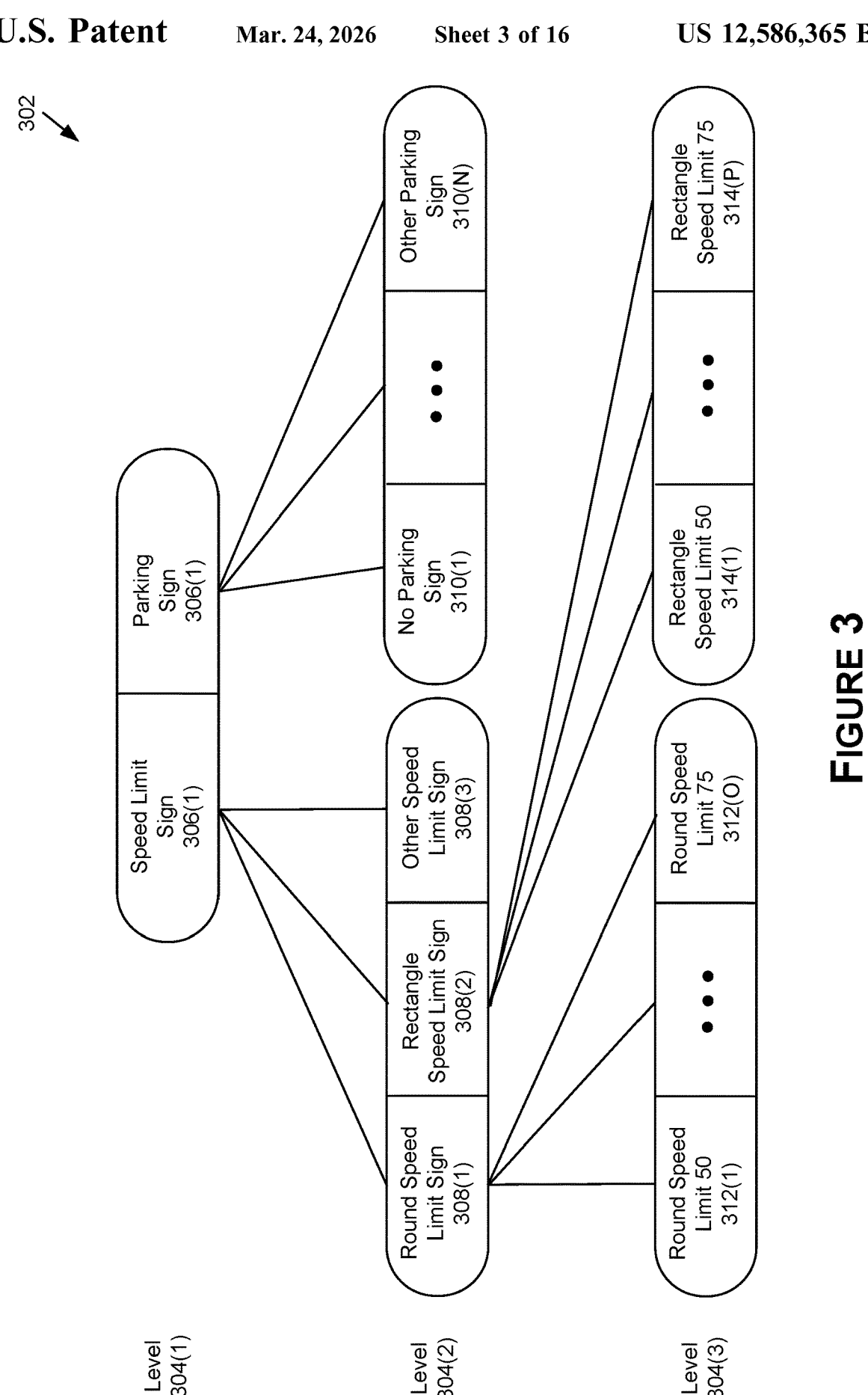
FIG. 3 illustrates an example of a hierarchy associated with traffic signs, in accordance with some embodiments of the present disclosure.

For instance, FIG. 3 illustrates an example of a hierarchy 302 associated with traffic signs, in accordance with some embodiments of the present disclosure. As shown by the example of FIG. 3, the hierarchy 302 may include three levels 304(1)-(3) (also referred to singularly as "level 304" or in plural as "levels 304") associated with the traffic signs. However, in other examples, a hierarchy may include any number of levels associated with traffic signs. Additionally, while the example of FIG. 3 illustrates the hierarchy 302 associated with traffic signs, in other examples, hierarchies may be generated for other types of objects (e.g., vehicles, animals, structures, etc.).

The first level 304(1) may include at least a first class group 306(1) associated with speed limit signs and a second class group 306(2) associated with parking signs. The second level 304(2) may then include additional class groups associated with the first class group 306(1) and object classifications associated with the second class group 306(2). For example, the second level 304(2) may include a first class group 308(1) associated with round speed limit signs, a second class group 308(2) associated with rectangle speed limit signs, and a third class group 308(3) associated with other speed limit signs. Additionally, the second level 304(2) may include a first object classification 310(1) associated with a no parking sign, one or more additional object classifications associated with one or more additional parking signs, and a final object classification 310(N) associated with other parking signs.

The third level 304(3) may then include object classifications associated with the first class group 308(1) and object classifications associated with the second class group 308(2). For example, the third level 304(3) may include a first object classification 312(1) associated with a round speed limit 50 sign, one or more additional object classifications associated with one or more additional round speed limit signs, and a final object classification 312(O) associated with a round speed limit 75 sign. The third level 304(3) may also include a first object classification 314(1) associated with a rectangle speed limit 50 sign, one or more additional object classifications associated with one or more additional rectangle speed limit signs, and a final object classification 314(O) associated with a rectangle speed limit 75 sign.

Referring back to the example of FIG. 1, the process 100 may include the processing component 124 processing the object attribute data 122, the object class data 126, and/or the object label data 128. For example, if the object attribute data 122 represents probabilities associated with attribute classifications, then the processing component 124 may determine one or more attribute classifications associated with the object using the probabilities. For example, and for an attribute type, the processing component 124 may analyze the probabilities associated with the attribute classifications included in the attribute type and, based at least on the processing, select the attribute classification that is associated with the highest probability as being the attribute classification associated with the attribute type. For instance, if the probabilities include a first probability associated with a round shape, a second probability associated with a square shape, and a third probability associated with a rectangle shape, then the processing component 124 may select the round shape when the first probability includes the highest probability. The processing component 124 may then perform similar processes to select one or more additional attribute classifications associated with one or more additional attribute types.

Additionally, if the object class data 126 represents probabilities associated with object classifications, then the processing component 124 may determine an object classification associated with the object using the probabilities. For example, the processing component 124 may analyze the probabilities associated with the object classifications and, based at least on the processing, select the object classification that is associated with the highest probability. For instance, if the probabilities include a first probability associated with a speed limit 50 sign, a second probability associated with a speed limit 60 sign, and a third probability associated with a speed limit 70 sign, then the processing component 124 may select the speed limit 50 sign when the first probability includes the highest probability.

Furthermore, if the object label data 128 represents probabilities associated with class groups and/or object classifications, then the processing component 124 may determine a class group and/or an object classification associated with the object using the probabilities. For example, the processing component 124 may analyze the probabilities associated with the class groups and/or the object classifications and, based at least on the processing, select the class group or the object classification that is associated with the highest probability. For instance, if the probabilities include a first probability associated with a first class group, a second probability associated with a second class group, and a third probability associated with an object classification, then the processing component 124 may select first class group when the first probability includes the highest probability.

In some examples, the processing component 124 may also perform one or more techniques for determining a final object classification associated with the object. For a first example, if the processing component 124 determines that an object classification is associated with the highest probability represented by the object label data 128, and the highest probability satisfies (e.g., is equal to or greater than) a threshold probability, then the processing component 124 may select the object classification to include the final object classification associated with the object. For instance, if the processing component 124 determines that the first object classification 312(1) from the example of FIG. 3 is associated with the highest probability and the highest probability is equal to or greater than the threshold probability, then the processing component 124 may select the first object classification 312(1) (e.g., a round speed limit 50 sign) as the final classification. As described herein, a threshold probability, which may be represented by probability data 130, may include, but is not limited to, 50%, 75%, 90%, 95%, 99%, 99.9%, and/or any other probability.

For a second example, if the processing component 124 determines that a class group is associated with the highest probability represented by the object label data 128, then the processing component 124 may select the object classification that is within the class group and is associated with the highest probability represented by the object class data 126. For instance, if the processing component 124 determines that the second class group 308(2) from the example of FIG. 3 is associated with the highest probability, and the object class data 126 represents probabilities associated with object classifications 314(1)-(P), then the processing component 124 may select the object classification 314(1)-(P) that is associated with the highest probability. Still, for a third example, if the processing component 124 determines that an object classification is associated with the highest probability represented by the object class data 126, and the highest probability satisfies (e.g., is equal to or greater than) a threshold probability, then the processing component 124 may select the object classification to include the final object classification associated with the object. For instance, if the object class data 126 again represents probabilities associated with the object classifications 314(1)-(P) from the example of FIG. 3, and the processing component 124 determines that the first object classification 312(1) is associated with the highest probability and the highest probability is equal to or greater than the threshold probability, then the processing component 124 may select the first object classification 312(1) (e.g., a round speed limit 50 sign) as the final object classification.

In some examples, the processing component 124 may use an order associated with the techniques. For example, the processing component 124 may initially use a first technique associated with the first example. However, if the processing component 124 determines that a class group is associated with the highest probability, then the processing component 124 may use a second technique associated with the second example. Additionally, if the processing component 124 determines the class group is not associated with any of the object classifications represented by the object class data 126, the processing component 124 may use a third technique associated with the third example. Additionally, while these are just three example techniques of how the processing component 124 may select the final object classification, in other examples, the processing component 124 may use additional and/or alternative techniques.

The process 100 may include the processing component 124 generating and/or outputting final class data 132 associated with the object. In some examples, the final class data 132 may represent the final object classification selected by the processing component 124. Additionally, in some examples, the final class data 132 may represent additional information, such as the attribute classification(s) determined using the object attribute data 122, the object classification determined using the object class data 126, and/or the class group and/or the object classification determined using the object label data 128.

Figure 4A:
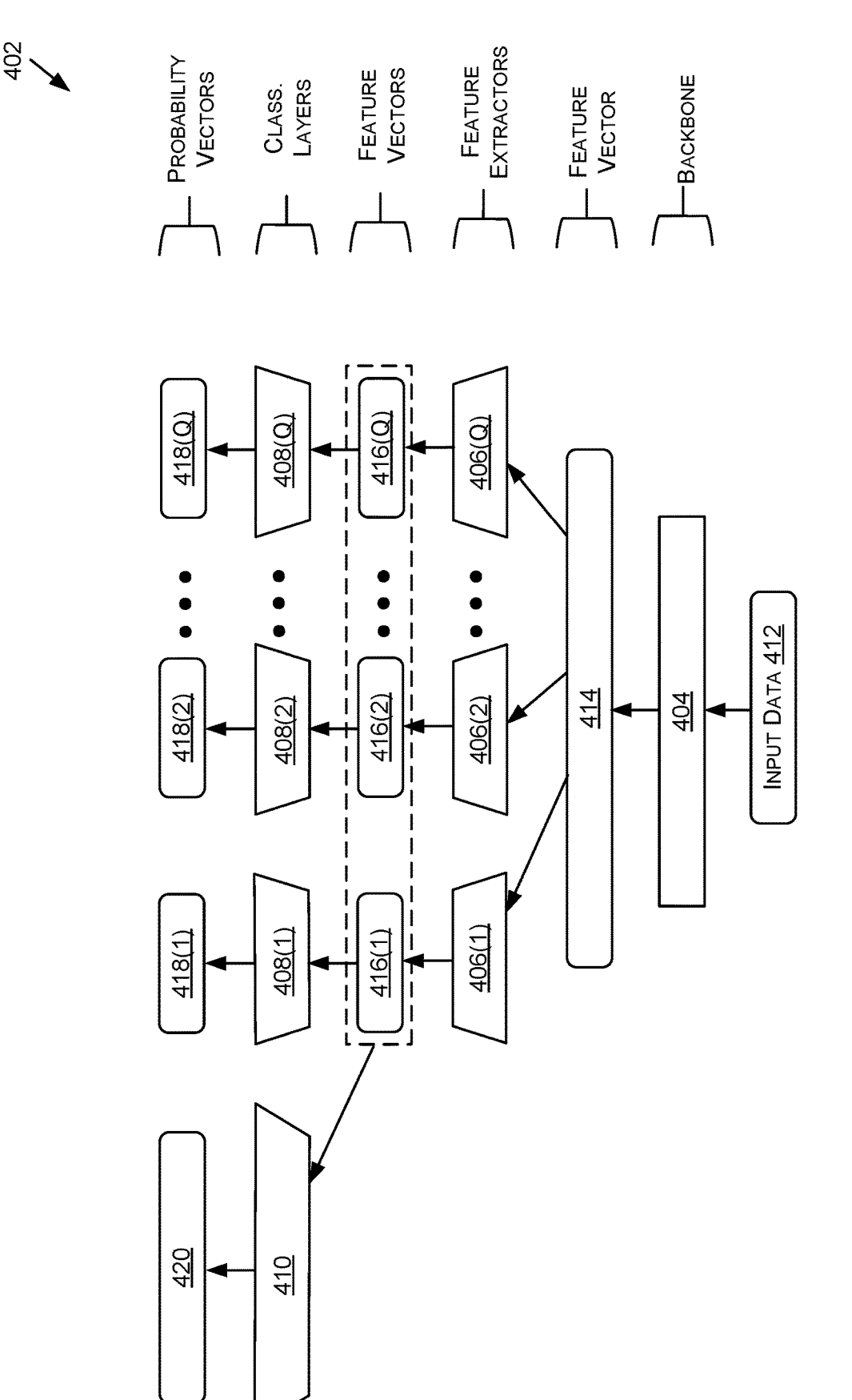
FIG. 4A illustrates a first example of one or more neural networks that classify objects, in accordance with some embodiments of the present disclosure.

For more detail, FIG. 4A illustrates a first example of one or more neural networks 402 (which may represent, and/or include, the neural network(s) 102) that classify objects, in accordance with some embodiments of the present disclosure. As shown, the neural network(s) 402 may include at least one or more layers associated with a backbone 404 (which may represent, and/or include, the backbone 116), one or more layers (which may represent, and/or include, at least a portion of the attribute layer(s) 110) associated with attribute feature extractors 406(1)-(Q) (also referred to singularly as "attribute feature extractor 406" or in plural as "attribute feature extractors 406"), one or more layers (which may represent, and/or include, at least a portion of the attribute layer(s) 110) associated with attribute classifications heads 408(1)-(Q) (also referred to singularly as "attribute classification head 408" or in plural as "attribute classification heads 408"), and one or more layers (which may represent, and/or include, the classification layer(s) 112) associated with an object classification head 410.

As shown, input data 412 (which may include, and/or be similar to, the input data 108 and/or the image data 106) may be input into the backbone 404. The backbone 404 may process the input data 412 and, based at least on the processing, output one or more feature vectors 414 associated with the input data 412. The attribute feature extractors 406 may then process the feature vector(s) 414 and, based at least on the processing, output attribute feature vectors 416(1)-(Q) (also referred to singularly as "attribute feature vector 416" or in plural as "attribute feature vectors 416"). For example, the first attribute feature extractor 406(1) may output one or more first attribute feature vectors 416(1), the second attribute feature extractor 406(2) may output one or more second attribute feature vectors 416(2), and/or so forth until the final attribute feature extractor 406(Q) outputs one or more final attribute feature vectors 416(Q). In such an example, the first attribute feature extractor 406(1) and/or the first attribute feature vector(s) 416(Q) may be associated with a first attribute type, the second attribute feature extractor 406(2) and/or the second attribute feature vector(s) 416(2) may be associated with a second attribute type, and/or so forth until the final attribute feature extractor 406(Q) and/or the final attribute feature vector(s) 416(Q) may be associated with a final attribute type.

As further shown, the first attribution classification head 408(1) may process the first attribute feature vector(s) 416(1) and, based at least on the processing, output one or more first probability vectors 418(1) associated with the first attribute type. Additionally, the second attribute classification head 408(2) may process the second attribute feature vector(s) 416(2) and, based at least on the processing, output one or more second probability vectors 418(2) associated with the second attribute type. Furthermore, this may continue such that the final attribute classification head 408(Q) may process the final attribute feature vector(s) 416(Q) and, based at least on the processing, outputs one or more final probability vectors 418(Q) associated with the final attribute type. The object classification head 410 may also process a combined attribute feature vector (e.g., represented by the dashed rectangle) and, based at least on the processing, output one or more probability vectors 420 associated with one or more object classifications, where the combined attribute feature vector may be generated by means such as but not limited to concatenating individual attribute feature vectors, or element-wise addition of individual attribute feature vectors.

In some examples, the processing component 124 may then analyze the probability vector(s) 420 and select an object classification associated with the object. For example, the processing component 124 may select the object classification associated with the highest probability. Additionally, the processing component 124 may analyze the first probability vector(s) 418(1) and select a first attribute classification associated with the first attribute type. For example, the processing component 124 may select the attribute classification associated with the highest probability. Furthermore, the processing component 124 may analyze the second probability vector(s) 418(2) and select a second attribute classification associated with the second attribute type. For example, the processing component 124 may select the attribute classification associated with the highest probability. Moreover, the processing component 124 may analyze the final probability vector(s) 418(Q) and select a final attribute classification associated with the final attribute type. For example, the processing component 124 may select the attribute classification associated with the highest probability.

Figure 4B:
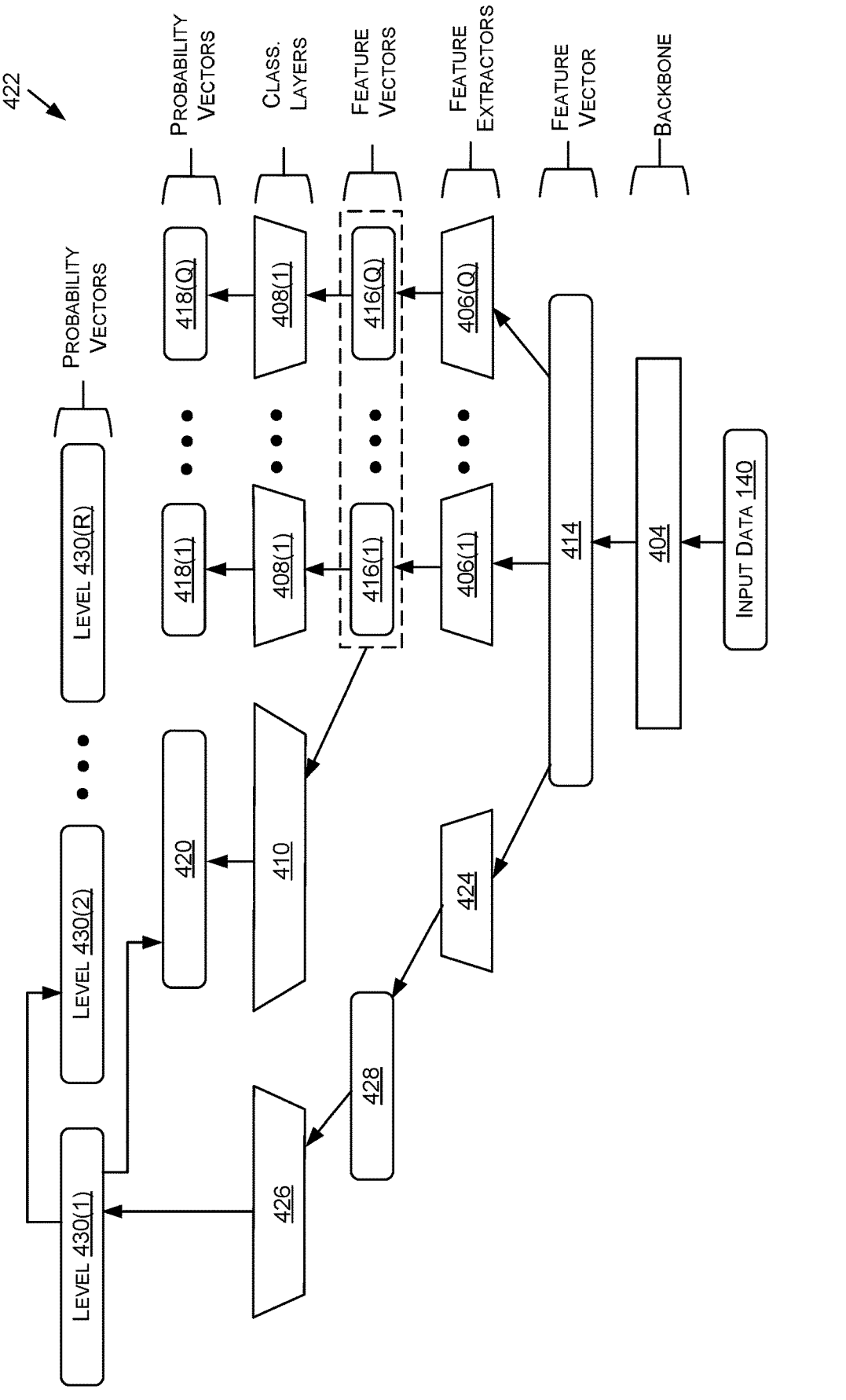
FIG. 4B illustrates a second example of one or more neural networks that classify objects, in accordance with some embodiments of the present disclosure.

FIG. 4B illustrates a second example of one or more neural networks 422 (which may represent, and/or include, the neural network(s) 102) that classify objects, in accordance with some embodiments of the present disclosure. As shown, the neural network(s) 422 may include at least the layers associated with the neural network(s) 402 (e.g., the first subnetwork, such as the multilabel subnetwork). However, the neural network(s) 422 may further includes one or more layers (which may represent, and/or include, at least a portion of the label layer(s) 114) associated with a hierarchical classification feature extractor 424 and one or more layers (which may represent, and/or include, at least a portion of the label layer(s) 114) associated with a hierarchical classification head 426 (e.g., the hierarchical subnetwork).

As shown, the hierarchical classification feature extractor 424 may process the feature vector(s) 414 and, based at least on the processing, output one or more hierarchical classification feature vectors 428. The hierarchical classification head 426 may then process the hierarchical classification feature vector(s) 428 and, based at least on the processing, output probability vectors 430(1)-(R) associated with different levels of classes. For instance, the first probability vector(s) 430(1) may be associated with a first class level, the second probability vector(s) 430(2) may be associated with a second class level, and/or so forth until the final probability vector(s) 430(R) may be associated with the final class level. For example, and referencing FIG. 3, the first probability vector(s) 430(1) may represent a first probability associated with the first class group 306(1) and a second probability associated with the second class group 306(2) from the first level 304(1). The second probability vector(s) 430(2) may then represent a first probability associated with the first class group 308(1), a second probability associated with the second class group 308(2), a third probability associated with the third class group 308(3), a fourth probability associated with the first object classification 310(1), and so forth until a final probability associated with the final object classification 310(N). Additionally, the final probability vector(s) 430(R) may be associated with the third level 304(3).

In some examples, the processing component 124 may then analyze the probability vectors 430(1)-(R) in order to select a class group and/or an object classification associated with the object. For a first example, if a class group is associated with the highest probability, then the processing component 124 may select the class group to associate with the object. For a second example, if an object classification is associated with the highest probability, then the processing component 124 may select the object classification to associate with the object. For a third example, if a first class group is associated with the highest probability, then the processing component 124 may select the first class group to associate with the object. The processing component 124 may then move to the next level associated with the selected first class group and select a second class group and/or an object classification that is associated with the highest probability in the next level. Additionally, the processing component 124 may continue this process until finally selecting an object classification associated with the object.

Additionally, or alternatively, in some examples, the processing component 124 may use at least the probability vector(s) 420 and the probability vectors 430(1)-(R) to select a final object classification to associate with the object. For a first example, if the processing component 124 determines that an object classification is associated with the highest probability represented by the probability vectors 430(1)-(R), and the highest probability satisfies (e.g., is equal to or greater than) a threshold probability, then the processing component 124 may select the object classification to include as the final object classification associated with the object. For instance, if the processing component 124 determines that the first object classification 312(1) from the example of FIG. 3 is associated with the highest probability and the highest probability is equal to or greater than the threshold probability, then the processing component 124 may select the first object classification 312(1) (e.g., a round speed limit 50 sign) as the final object classification.

For a second example, if the processing component 124 determines that a class group is associated with the highest probability represented by the probability vectors 430(1)-(R), then the processing component 124 may select the object classification that is within the class group and is associated with the highest probability represented by the probability vector(s) 420. For instance, if the processing component 124 determines that the second class group 308(2) from the example of FIG. 3 is associated with the highest probability, and the probability vector(s) 420 represents probabilities associated with the object classifications 314(1)-(P), then the processing component 124 may select the object classification 314(1)-(P) that is associated with the highest probability. Still, for a third example, if the processing component 124 determines that an object classification is associated with the highest probability represented by the probability vector(s) 420, and the highest probability satisfies (e.g., is equal to or greater than) a threshold probability, then the processing component 124 may select the object classification to include as the final object classification associated with the object. For instance, if the probability vector(s) 420 again represents probabilities associated with the object classifications 314(1)-(P) from the example of FIG. 3, and the processing component 124 determines that the first object classification 312(1) is associated with the highest probability and the highest probability is equal to or greater than the threshold probability, then the processing component 124 may select the first object classification 312(1) (e.g., a round speed limit 50 sign) as the final object classification.

While the example of FIG. 4B illustrates the neural network(s) 422 as combining the first subnetwork and the second subnetwork, in other examples, the neural network(s) 422 may split the first subnetwork from the second network. For example, the neural network(s) 422 may include a first neural network(s) that is similar to the neural network(s) 402 as well as a second neural network(s) that includes a backbone (e.g., similar to the backbone 404), the hierarchical classification feature extractor 424, and the hierarchical classification head 426.

Figure 5:
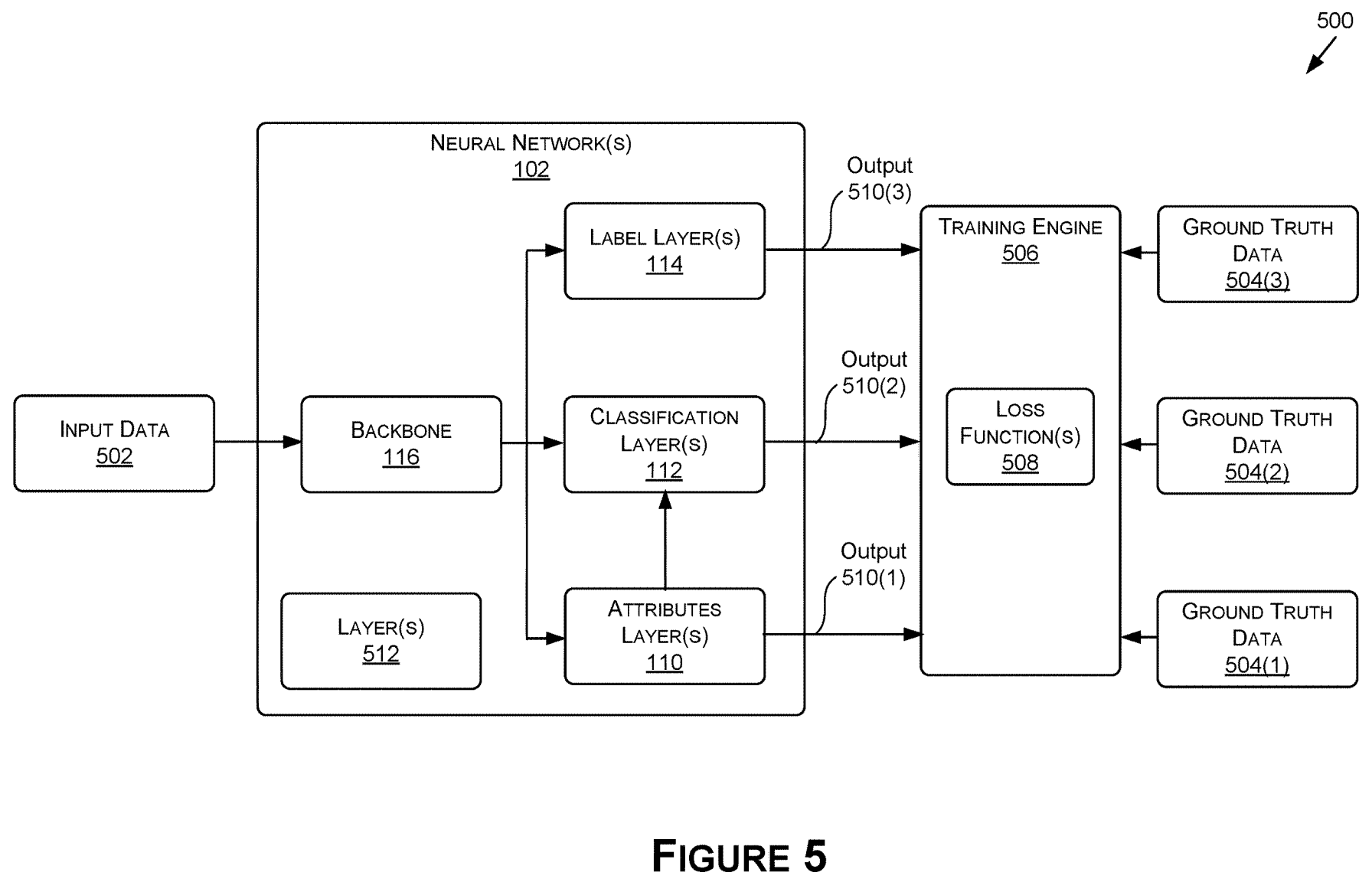

In some examples, one or more processes may be performed in order to train one or more of the neural networks described herein. For instance, FIG. 5 is a data flow diagram illustrating a process 500 for training the neural network(s) 102 associated with the example of FIG. 1, in accordance with some embodiments of the present disclosure. As shown, the neural network(s) 102 may be trained using input data 502 (which may represent, and/or be similar to, the input data 108 and/or the image data 106). The input data 502 used for training may include original images (e.g., as captured by one or more image sensors), down-sampled images, up-sampled images, cropped or region of interest (ROI) images, otherwise augmented images, and/or a combination thereof. The input data 502 may represent images captured by one or more image sensors and/or may be images captured from within a virtual environment used for testing and/or generating training image data (e.g., a virtual camera of a virtual machine within a virtual or simulated environment). In some examples, the input data 502 may represent images and/or other sensor data representations from a data store or repository of training sensor data.

The neural network(s) 102 may be trained using the input data 502 as well as corresponding ground truth data 504(1)-(3) (also referred to as "ground truth data 504"). The ground truth data 504 may include annotations, labels, masks, and/or the like. The ground truth data 504 may be generated within a drawing program (e.g., an annotation program), a computer aided design (CAD) program, a labeling program, another type of program suitable for generating the ground truth data 504, and/or may be hand drawn, in some examples. In any example, the ground truth data 504 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer). In some examples, for each input image, there may be corresponding ground truth data 504.

For instance, and for an image represented by the input data 502, the ground truth data 504(1) may represent one or more attribute classifications associated with an object depicted by the image, the ground truth data 504(2) may represent an object classification associated with the object, and the ground truth data 504(3) may represent a class group and/or the object classification associated with the object. For example, if the image depicts a rectangular speed limit sign of 50 MPH, then the ground truth data 504(1) may represent attribute classifications that includes "white" color, "rectangle" shape, and text that includes "SPEED", "LIMIT", and "50", the ground truth data 504(2) may represent the object classification "rectangle speed limit 50," and the ground truth data 504(3) may represent a first class group of "speed limit sign," a second class group of "rectangle speed limit sign," and/or the object classification "rectangle speed limit 50."

A training engine 506 may use one or more loss functions 508 that measure loss (e.g., error) in outputs 510(1)-(3) (also referred to as "outputs 510") as compared to the ground truth data 504. Any type of loss function may be used, such as cross entropy loss, mean squared error, mean absolute error, mean bias error, and/or other loss function types. In some examples, different outputs 510 may have different loss functions. For example, a first loss function(s) 508 may measure a first loss in the first output 510(1) as compared to the first ground truth data 504(1), a second loss function(s) 508 may measure a second loss in the output 510(2) as compared to the second ground truth data 504(2), and a third loss function(s) 508 may measure a third loss in the third output 510(3) as compared to the third ground truth data 504(3). In some examples, backward pass computations may be performed to recursively compute gradients of the loss function(s) 508 with respect to training parameters. In some examples, weight and biases of the neural network(s) 102 may be used to compute these gradients.

In some examples, the training engine 506 may use one or more techniques when training the neural network(s) 102. For a first example, if the training engine 506 is training the neural network(s) 102 using only the third ground truth data 504(3), then the training engine 506 may only compute losses for the label layer(s) 114 of the neural network(s) 102 and backpropagation of gradients may only be through the label layer(s) 114 and/or the backbone 116. For a second example, if the training engine 506 is training the neural network(s) 102 using all of the ground truth data 504, then the training engine 506 may compute losses for the attribute layer(s) 110, the classification layer(s) 112, and the label layer(s) 114 and backpropagation of gradients may be through the attribute layer(s) 110, the classification layer(s) 112, the label layer(s) 114, and the backbone 116. Still, for a third example, if the training engine 506 is training the neural network(s) 102 using the first ground truth data 504(1) and the second ground truth data 504(2), then the training engine 506 may compute losses for the attribute layer(s) 110 and classification layer(s) 112 and backpropagation of gradients may be through the attribute layer(s) 110, the classification layer(s) 112, and the backbone 116.

In some examples, one or more additional layers 512 may be added to the neural network(s) 102 during training, such as to improve the performance of the training. For instance, the layer(s) 512 may include one or more stop-gradient layers located between the classification layer(s) 112 and the attribute layer(s) 110, between the attribute layer(s) 110 and the backbone 116, between the classification layer(s) 112 and the backbone 116, and/or between the label layer(s) 114 and the backbone 116. The stop-gradient layer(s) may be configured to stop gradients from backpropagating through the rest of the neural network(s) 102. In some examples, this may help train the neural network(s) 102 for new classes of objects, such as new traffic signs.

In some examples, the process 500 may continue to repeat until the occurrence of one or more evens. For example, the process 500 may continue to repeat until a total loss is below a threshold loss, an accuracy on a validation dataset is greater than an accuracy threshold, and/or a pre-defined number of training epochs is reached. While these are just a couple example events that may cause the training to be complete, in other examples, the training may be complete based on the occurrence of one or more additional and/or alternative events.

Figure 6A:
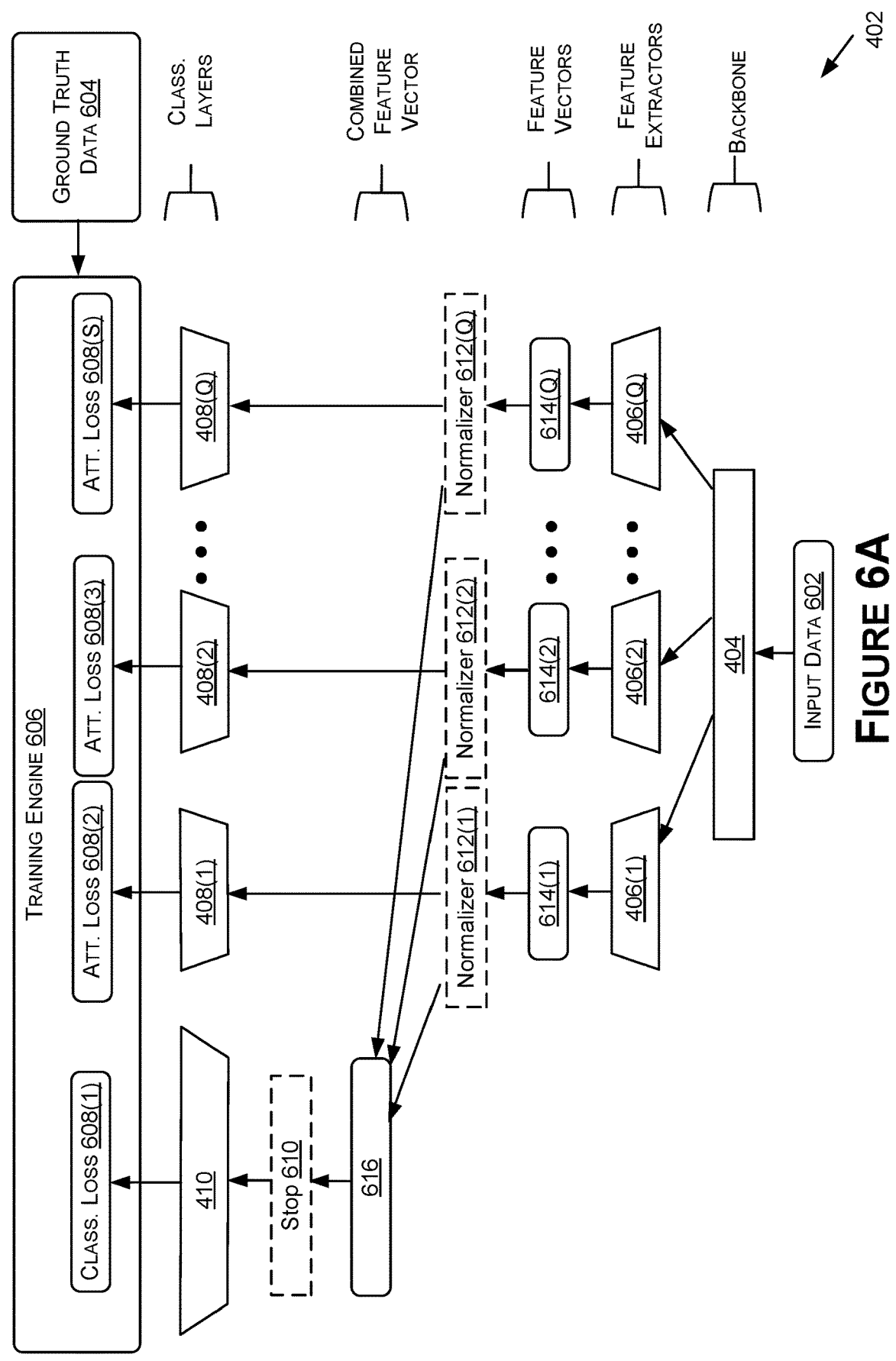
FIG. 6A is an example of training the neural network(s) from the example of FIG. 4A, in accordance with some embodiments of the present disclosure.

FIG. 6A is an example of training the neural network(s) 402 from the example of FIG. 4A, in accordance with some embodiments of the present disclosure. As shown, the neural network(s) 402 may be trained using input data 602 (which may be similar to the input data 412) and corresponding ground truth data 604 (which may be similar to the ground truth data 504). For instance, a training engine 606 (which may be similar to, and/or represent, the training engine 506) may measure one or more losses 608(1) by comparing outputs associated with an object classification(s) to the ground truth data 604, one or more losses 608(2) by comparing outputs associated with the first attribute type to the ground truth data 604, one or more losses 608(3) by comparing outputs associated with the second attribute type to the ground truth data 604, and/or one or more losses 608(S) by comparing outputs associated with the last attribute type to the ground truth data 604. As described herein, the training engine 606 may determine the losses using one or more loss functions, such as one or more of the loss function(s) 508. For example, a first loss function may determine the loss(es) 608(1), a second loss function may determine the loss(es) 608(2), a third loss function may determine the loss(es) 608(3), and/or so forth until a last loss function may determine the loss(es) 608(S).

The losses 608(1)-(S) may then be used when backpropagating gradients through the neural network(s) 402. For example, the loss(es) 608(1) may be used to backpropagate gradients through the object classification head 410, the attribute feature extractors 406, and/or the backbone 404, the loss(es) 608(2) may be used to backpropagate gradients through the attribute classification head 408(1), the attribute feature extractor 406(1), and/or the backbone 404, the loss(es) 608(3) may be used to backpropagate gradients through the attribute classification head 408(2), the attribute feature extractor 406(2), and/or the backbone 404, and the loss(es) 608(S) may be used to backpropagate gradients through the attribute classification head 408(Q), the attribute feature extractor 406(Q), and/or the backbone 404. However, in other examples, any of the losses 608(1)-(S) may be used to backpropagate gradients through any of the layers of the neural network(s) 402.

In some examples, and as also shown by the example of FIG. 6A, the neural network(s) 402 may optionally include one or more layers associated with a stop-gradient 610 located before the object classification head 410. In such examples, the stop-gradient 610 may stop the backpropagating of gradients associated with the loss(es) 608(1) through the attribute feature extractors 406 and/or the backbone 404. Additionally, or alternatively, in some examples, the neural network(s) 402 may include one or more L2 normalization layers 612(1) for transforming one or more feature vectors 614(1) into a unit length, one or more L2 normalization layers 612(2) for transforming one or more feature vectors 614(2) into the unit length, and/or one or more L2 normalization layers 612(Q) for transforming one or more feature vectors 614(Q) into the unit length, where the feature vectors 614(1)-(Q) are then combined to generate a feature vector 616 that is input into the object classification head 410. Furthermore, while not illustrated in the examples of FIGS. 4A-4B, the neural network(s) 402 and/or the neural network(s) 422 may include the one or more of the L2 normalization layers 612(1)-(Q).

Figure 6B:
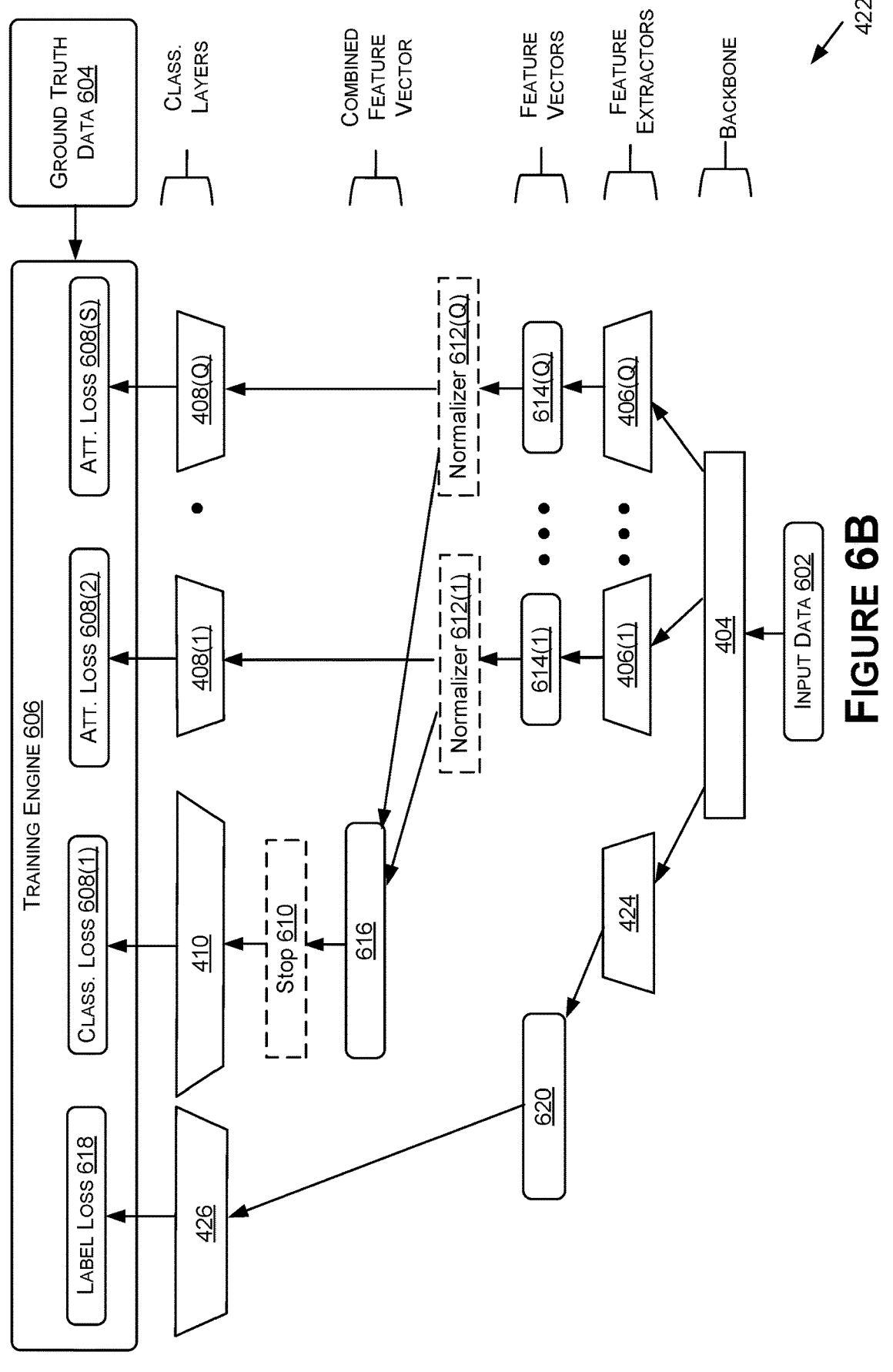
FIG. 6B is an example of training the neural network(s) from the example of FIG. 4B, in accordance with some embodiments of the present disclosure.

FIG. 6B is an example of training the neural network(s) 422 from the example of FIG. 4B, in accordance with some embodiments of the present disclosure. As shown, the neural network(s) 422 may be trained similar to the neural network(s) 402, however, the training engine 606 may further measure one or more losses 618 by comparing outputs associated with a class label(s) (e.g., a class group(s), an object classification(s), etc.) associated with an object(s) to the ground truth data 604. The loss(es) 618 may then be used to backpropagate gradients through the hierarchical classification head 426, the hierarchical classification feature extractor 424, and/or the backbone 404. In some examples, performing such training may increase the accuracy of the neural network(s) 422, such as by generating one or more hierarchical classification feature vectors 620 that improve the outputs from the hierarchical classification head 426. In some examples, the neural network(s) 422 may continue to be trained until the occurrence of one or more of the events described herein.

Now referring to FIGS. 7-8, each block of methods 700 and 800, described herein, comprises a computing process that may be performed using any combination of hardware, firmware, and/or software. For instance, various functions may be carried out by a processor executing instructions stored in memory. The methods 700 and 800 may also be embodied as computer-usable instructions stored on computer storage media. The methods 700 and 800 may be provided by a standalone application, a service or hosted service (standalone or in combination with another hosted service), or a plug-in to another product, to name a few. In addition, the methods 700 and 800 are described, by way of example, with respect to FIG. 1. However, these methods 700 and 800 may additionally or alternatively be executed by any one system, or any combination of systems, including, but not limited to, those described herein.

FIG. 7 illustrates a flow diagram showing a method 700 for using one or more neural networks to determine an object classification and an attribute classification associated with an object, in accordance with some embodiments of the present disclosure. The method 700, at block B702, may include determining, using one or more neural networks and based at least on image data representative of an object, first data associated with one or more attribute classifications of the object. For instance, the image data 106 (and/or the input data 108) representing the object, such as a traffic sign, may be input into the neural network(s) 102 (and/or the neural network(s) 402). The neural network(s) 102 may then process the image data 106 (e.g., using the attribute layer(s) 110) and, based at least on the processing, generate output data 120 representative of the one or more attribute classifications. As described herein, an attribute classification may be associated with an attribute type such as, but not limited to, a shape of the object, a color of the object, text associated with the object, a graphic associated with the object, a size of the object, and/or any other type of attribute associate with objects.

The method 700, at block B704, may include determining, using the one or more neural networks and based at least on the first data, a first output indicating at least an object classification associated with the object. For instance, the neural network(s) 102 (e.g., the classification layer(s) 112) may process the output data 120 and, based at least on the processing, determine the first output indicating the object classification. In some examples, the first output may include the object label data 128 representing one or more probabilities associated with one or more object classifications. The processing component 124 may then use the one or more probabilities to select one of the object classification(s), such as the object classification that is associated with the highest probability. In some examples, such as when the processing component 124 is part of the neural network(s) 102, the first output may include the final class data 132 representing the object classification.

The method 700, at block B706, may include determining, using the one or more neural networks and based at least on the first data, a second output indicating at least an attribute classification of the one or more attribute classifications. For instance, the neural network(s) 102 (e.g., the attribute layer(s) 110) may process the output data 120 and, based at least on the processing, determine the second output indicating the attribute classification. In some examples, the second output may include the object attribute data 122 representing one or more probabilities associated with the attribute classifications. The processing component 124 may then use the one or more probabilities to select one of the attribute classification(s), such as the attribute classification that is associated with the highest probability. In some examples, such as when the processing component 124 is part of the neural network(s) 102, the second output may include the final class data 132 representing the attribute classification. Still, in some examples, the neural network(s) 102 may determine a respective attribute classification for more than one attribute type.

The method 700, at block B708, may include causing, based at least on the first output and the second output, a machine to perform one or more operations. For instance, the machine may use at least the object classification associated with the object to perform the operation(s). For instance, if the object is a traffic sign and the object classification indicates the type of traffic sign, then the machine may navigate based on the type of traffic sign (e.g., follow a speed limit indicated by a speed limit sign, stop at a location indicated by a stop sign, etc.).

FIG. 8 illustrates a flow diagram showing a method 800 for using one or more neural networks to classify an object, in accordance with some embodiments of the present disclosure. The method 800, at block B802, may include determining, using one or more neural networks and based at least on image data representative of an object, a first output associated with classifying the object. For instance, the image data 106 (and/or the input data 108) representing the object, such as a traffic sign, may be input into the neural network(s) 102 (and/or the neural network(s) 422). The neural network(s) 102 may then process the image data 106 (e.g., using the attribute layer(s) 110 and/or the classification layer(s) 112) and, based at least on the processing, output the object class data 126 representing one or more probabilities associated with one or more object classifications for the object.

The method 800, at block B804, may include determining, based at least on the image data representative of the object, a second output associated with a hierarchy corresponding to the object. For instance, based at least on processing the image data 106, the neural network(s) 102 (e.g., the label layer(s) 114 may also output the object label data 128 representing one or more probabilities associated with one or more group classes for the object and/or one or more probabilities associated with one or more object classifications for the object.

The method 800, at block B806, may include determining, based at least on the first output and the second output, an object classification associated with the object. For instance, the processing component 124 (and/or the neural network(s) 102) may perform one or more techniques to determine the object classification associated with the object using the object class data 126 and the object label data 128. For a first example, if the processing component 124 determines that an object classification is associated with the highest probability represented by the object label data 128, and the highest probability satisfies (e.g., is equal to or greater than) a threshold probability, then the processing component 124 may select the object classification to include the final object classification associated with the object. For a second example, if the processing component 124 determines that a class group is associated with the highest probability represented by the object label data 128, then the processing component 124 may select the object classification that is within the class group and is associated with the highest probability represented by the object class data 126. Still, for a third example, if the processing component 124 determines that an object classification is associated with the highest probability represented by the object class data 126, and the highest probability satisfies (e.g., is equal to or greater than) a threshold probability, then the processing component 124 may select the object classification to include the final object classification associated with the object.

The method 800, at block B808, may include causing, based at least on the object classification, a machine to perform one or more operations. For instance, the machine may use at least the object classification associated with the object to perform the operation(s). For instance, if the object is a traffic sign and the object classification indicates the type of traffic sign, then the machine may navigate based on the type of traffic sign (e.g., follow a speed limit indicated by a speed limit sign, stop at a location indicated by a stop sign, etc.).

Example Autonomous Vehicle

Figure 9A:
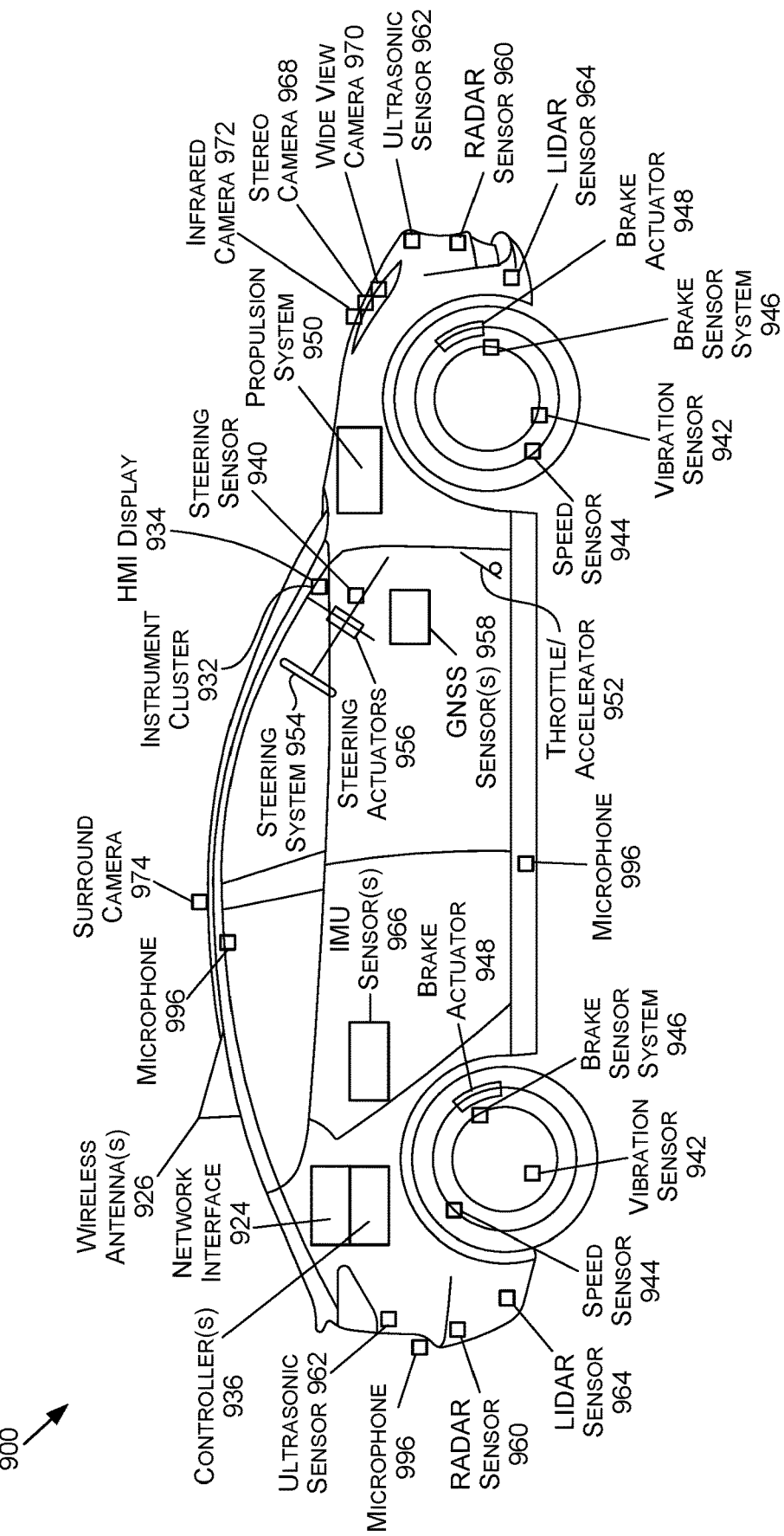
FIG. 9A is an illustration of an example autonomous vehicle, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3-Level 5 of the autonomous driving levels. The vehicle 900 may be capable of functionality in accordance with one or more of Level 1-Level 5 of the autonomous driving levels. For example, the vehicle 900 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 900 or other machine, such as being fully autonomous, being highly autonomous, being conditionally autonomous, being partially autonomous, providing assistive autonomy, being semi-autonomous, being primarily autonomous, or other designation.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems ("GNSS") sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor(s) (e.g., as part of the brake sensor system 946), and/or other sensor types.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the High Definition ("HD") map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 900 further includes a network interface 924 which may use one or more wireless antenna(s) 926 and/or modem(s) to communicate over one or more networks. For example, the network interface 924 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 926 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 9B:
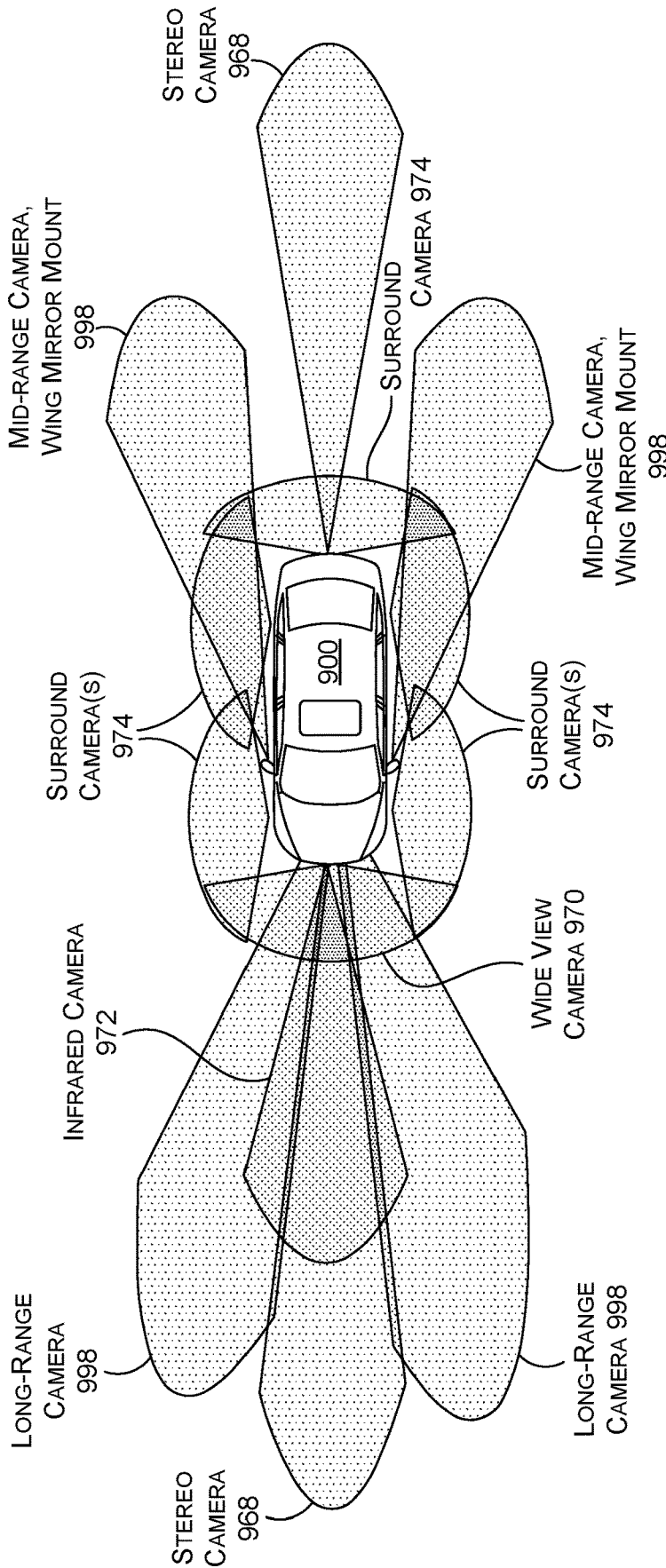
FIG. 9B is an example of camera locations and fields of view for the example autonomous vehicle of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may be any number (including zero) of wide-view cameras 970 on the vehicle 900. In addition, any number of long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

Any number of stereo cameras 968 may also be included in a front-facing configuration. In at least one embodiment, one or more of stereo camera(s) 968 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. Four example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Figure 9C:
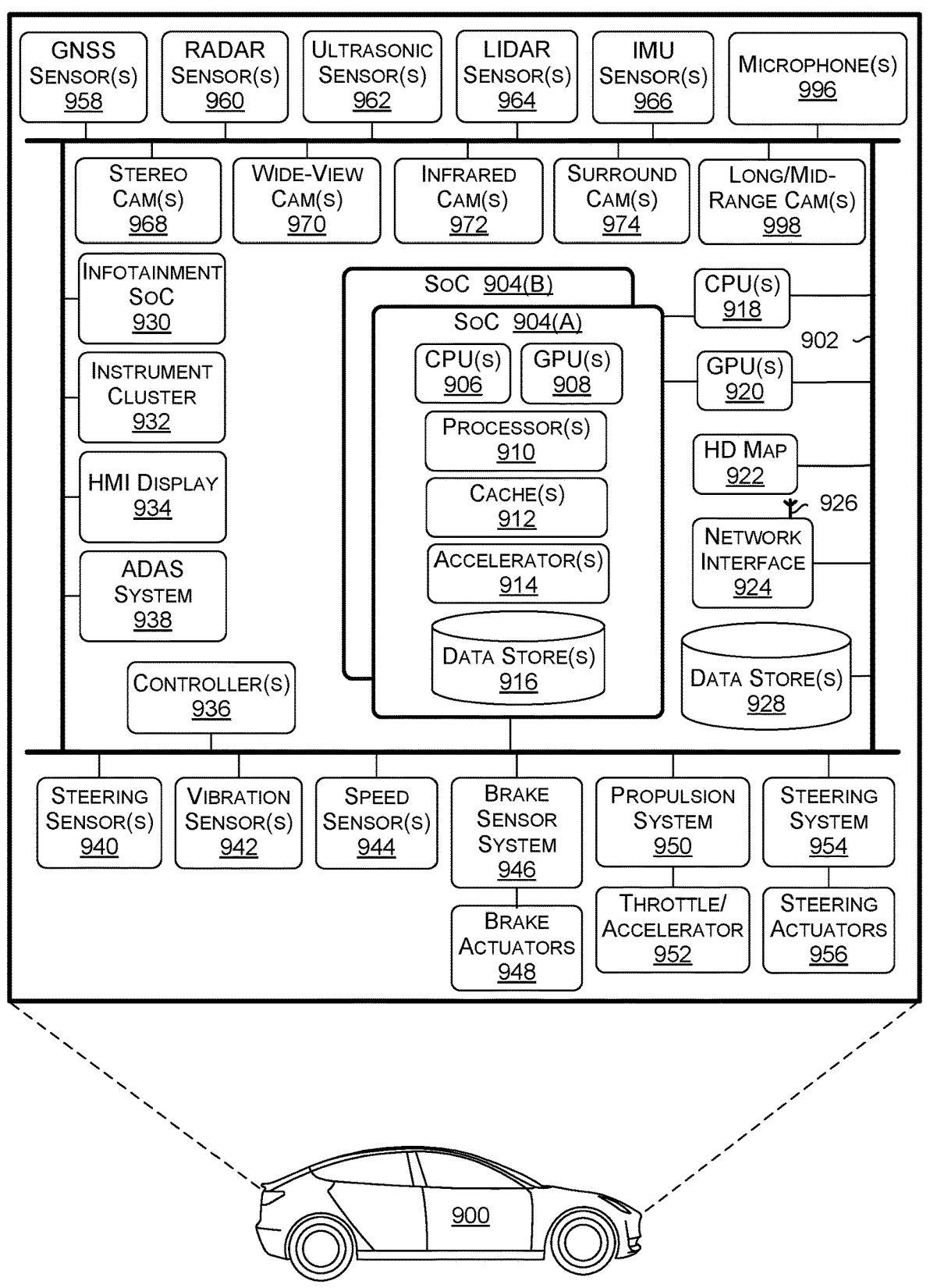
FIG. 9C is a block diagram of an example system architecture for the example autonomous vehicle of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol. In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s)

912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include an arithmetic logic unit(s) (ALU(s)) which may be leveraged in performing processing with respect to any of the variety of tasks or operations of the vehicle 900-such as processing DNNs. In addition, the SoC(s) 904 may include a floating point unit(s) (FPU(s))— or other math coprocessor or numeric coprocessor types— for performing mathematical operations within the system. For example, the SoC(s) 104 may include one or more FPUs integrated as execution units within a CPU(s) 906 and/or GPU(s) 908.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 966 output that correlates with the vehicle 900 orientation, distance, 3D location estimates of the object obtained from the neural network and/or other sensors (e.g., LIDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 912 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management.

The processor(s) 910 may further include a high-dynamic range signal processor that may include an image signal processor that is a hardware engine that is part of the camera processing pipeline.

The processor(s) 910 may include a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LIDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK). The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS, assisted GPS sensors, differential GPS (DGPS) sensors, etc.), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LIDAR sensor(s) 964. The LIDAR sensor(s) 964 may be used for object and pedestrian detection, emergency braking, collision avoidance, and/or other functions. The LIDAR sensor(s) 964 may be functional safety level ASIL B. In some examples, the vehicle 900 may include multiple LIDAR sensors 964 (e.g., two, four, six, etc.) that may use Ethernet (e.g., to provide data to a Gigabit Ethernet switch).

In some examples, the LIDAR sensor(s) 964 may be capable of providing a list of objects and their distances for a 360-degree field of view. Commercially available LIDAR sensor(s) 964 may have an advertised range of approximately 900 m, with an accuracy of 2 cm-3 cm, and with support for a 900 Mbps Ethernet connection, for example. In some examples, one or more non-protruding LIDAR sensors 964 may be used. In such examples, the LIDAR sensor(s) 964 may be implemented as a small device that may be embedded into the front, rear, sides, and/or corners of the vehicle 900. The LIDAR sensor(s) 964, in such examples, may provide up to a 120-degree horizontal and 35-degree vertical field-of-view, with a 200 m range even for low-reflectivity objects. Front-mounted LIDAR sensor(s) 964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 900. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, an accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LIDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 900), while the I2V communication concept provides information about traffic further ahead. CACC systems may include either or both I2V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
FIG. 9D is a system diagram for communication between cloud-based server(s) and the example autonomous vehicle of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984(H) (collectively referred to herein as GPUs 984), PCIe switches 982(A)-982(H) (collectively referred to herein as PCIe switches 982), and/or CPUs 980(A)-980(B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers).

The server(s) 978 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 990, and/or the machine learning models may be used by the server(s) 978 to remotely monitor the vehicles.

In some examples, the server(s) 978 may receive data from the vehicles and apply the data to up-to-date real-time neural networks for real-time intelligent inferencing. The server(s) 978 may include deep-learning supercomputers and/or dedicated AI computers powered by GPU(s) 984, such as a DGX and DGX Station machines developed by NVIDIA. However, in some examples, the server(s) 978 may include deep learning infrastructure that use only CPU-powered datacenters.

The deep-learning infrastructure of the server(s) 978 may be capable of fast, real-time inferencing, and may use that capability to evaluate and verify the health of the processors, software, and/or associated hardware in the vehicle 900. For example, the deep-learning infrastructure may receive periodic updates from the vehicle 900, such as a sequence of images and/or objects that the vehicle 900 has located in that sequence of images (e.g., via computer vision and/or other machine learning object classification techniques). The deep-learning infrastructure may run its own neural network to identify the objects and compare them with the objects identified by the vehicle 900 and, if the results do not match and the infrastructure concludes that the AI in the vehicle 900 is malfunctioning, the server(s) 978 may transmit a signal to the vehicle 900 instructing a fail-safe computer of the vehicle 900 to assume control, notify the passengers, and complete a safe parking maneuver.

For inferencing, the server(s) 978 may include the GPU(s) 984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 10:
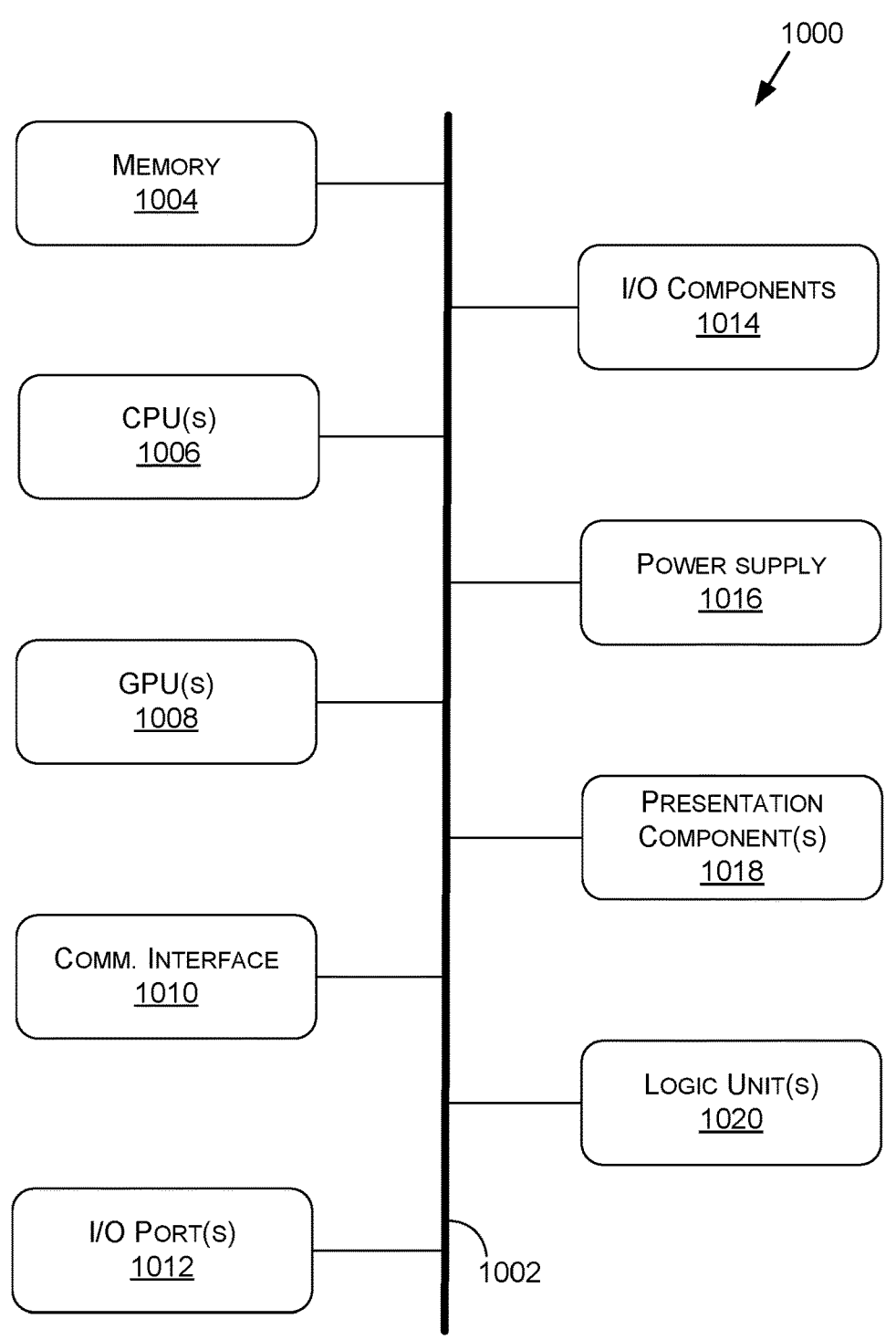
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
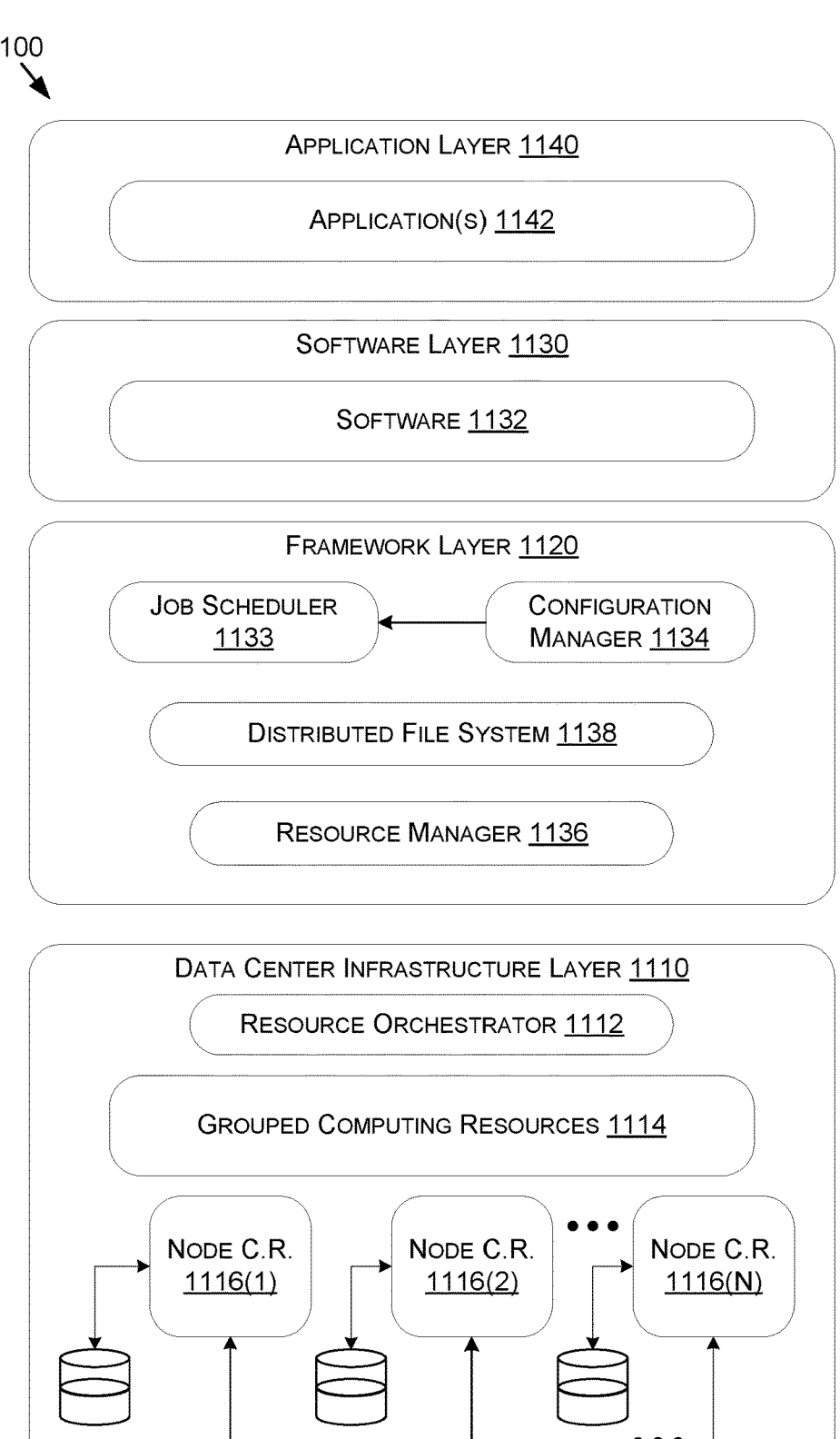
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161(N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1133, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1133 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1133. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

determining, using one or more neural networks and based at least on sensor data corresponding to a sign, data associated with one or more attribute classifications of the sign;

determining, using one or more first layers of the one or more neural networks and based at least on the data, a first output indicating one or more sign classifications associated with the sign;

determining, using one or more second layers of the one or more neural networks that are different from the one or more first layers, and based at least on the data, a second output indicating at least an attribute classification, from the one or more attribute classifications, associated with the sign; and causing, based at least on the first output and the second output, a machine to perform one or more operations.

2. The method of claim 1, wherein the first output represents one or more probabilities associated with the one or more sign classifications, and wherein the method further comprises:

determining, based at least on the first output, that a sign classification, of the one or more sign classifications, is associated with a highest probability of the one or more probabilities, wherein the causing the machine to perform the one or more operations is based at least on the sign classification and the second output.

3. The method of claim 1, wherein the data represents one or more probabilities associated with the one or more attribute classifications, and wherein the determining of the second output comprises:

determining, using the one or more second layers of the one or more neural networks and based at least on the data, that the attribute classification, of the one or more attribute classifications, is associated with a highest probability of the one or more probabilities; and determining, based at least on the attribute classification being associated with the highest probability, the second output indicating the at least the attribute classification associated with the sign.

4. The method of claim 1, wherein the one or more attribute classifications are associated with a first type of attribute, the data is further associated with one or more second attribute classifications that are associated with a second type of attribute, and the method further comprises determining, based at least on the data, a third output indicating at least a second attribute classification, from the one or more second attribute classifications, associated with the sign.

5. The method of claim 1, wherein:

the determining the data associated with the one or more attribute classifications of the sign uses one or more feature extractor layers of the one or more neural networks; and the data associated with the one or more attribute classifications of the sign comprises data representative of one or more vectors representing the one or more attribute classifications.

6. The method of claim 1, further comprising:

determining, using the one or more neural networks and based at least on the sensor data, a third output indicating at least one of a class group associated with the sign or a second sign classification associated with the sign, wherein the causing the machine to perform the one or more operations is further based at least on the third output.

7. The method of claim 6, further comprising:

determining, based at least on the first output and the second output, a sign classification associated with the sign, wherein the causing the machine to perform the one or more operations is based at least on the sign classification.

8. A system comprising:

one or more processors to:

determine, using one or more neural networks and based at least on sensor data representative of an object, a first output indicating one or more object classifications for classifying the object;

determine, using the one or more neural networks and based at least on the sensor data representative of the object, a second output associated with a hierarchy corresponding to the object, the hierarchy indicating at least one or more group classifications along with the one or more object classifications that are included in a group classification of the one or more group classifications;

determine, based at least on the first output and the second output, that an object classification from the one or more object classifications is associated with the object; and cause, based at least on the object classification, a machine to perform one or more operations.

9. The system of claim 8, wherein the second output represents at least one or more probabilities associated with the one or more object classifications, and wherein the determination of the object classification associated with the object comprises:

determining, based at least on the second output, that the object classification, from the one or more object classifications, is associated with a highest probability from the one or more probabilities; and determining, based at least on the object classification being associated with the highest probability, the object classification associated with the object without considering the first output.

10. The system of claim 8, wherein the first output represents one or more probabilities associated with the one or more object classifications, and wherein the determination of the object classification associated with the object comprises:

determining, based at least on the first output, that the object classification, from the one or more object classifications, is associated with a probability that satisfies a threshold probability; and determining, based at least on the probability satisfying the threshold probability and the second output, the object classification associated with the object.

11. The system of claim 8, wherein the determination of the object classification associated with the object comprises:

determining, based at least on the second output, that group classification of the one or more group classifications is associated with the object;

determining, based at least on the first output, the object classification is associated with the group classification and includes a highest probability from one or more probabilities associated with the group classification; and determining, based at least on the object classification being associated with the group classification and including the highest probability, the object classification associated with the object.

12. The system of claim 8, wherein:

the first output indicating the one or more object classifications for classifying the object is determined using one or more first layers associated with the one or more neural networks; and the second output associated with the hierarchy corresponding to the object is determined using one or more second layers associated with the one or more neural networks.

13. The system of claim 8, wherein the one or more processors are further to:

determine, using a backbone of the one or more neural networks and based at least on the sensor data, one or more feature vectors, wherein:

the first output indicating the one or more object classifications for classifying the object is determined based at least on the one or more feature vectors; and the second output associated with the hierarchy corresponding to the object is determined based at least on the one or more feature vectors.

14. The system of claim 8, wherein the one or more processors are further to:

determine, using the one or more neural networks and based at least on the sensor data representative of the object, data associated with one or more attribute classifications of the object, wherein the first output indicating the one or more object classifications for classifying the object is determined based at least on the data.

15. The system of claim 14, wherein the one or more processors are further to determine, using the one or more neural networks and based at least on the data, a third output associated with an attribute, from the one or more attributes, to associate with the object.

16. The system of claim 15, wherein:

the object includes a traffic sign;

the object classification includes a sign type associated with the traffic sign; and the one or more attribute classifications include one or more of a shape of the traffic sign, a color of the traffic sign, text of the traffic sign, or a graphic of the traffic sign.

17. The system of claim 8, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system implementing one or more large language models (LLMs);

a system for generating synthetic data;

a system incorporating one or more virtual machines (VMs);

a system implemented at least partially in a data center; or a system implemented at least partially using cloud computing resources.

18. One or more processors comprising processing circuitry to:

determine, using one or more neural networks and based at least on sensor data corresponding to an object, a first output indicating one or more class groups associated with the object and a second output indicating one or more object classifications associated with the object;

determine, based at least on the first output, a class group from the one or more class groups;

determine, based at least on the second output, an object classification from the one or more object classifications that is included in the class group; and determine, based at least on the object classification being included in the class group, that the object classification includes a final object classification associated with the object.

19. The one or more processors of claim 18, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system implementing one or more large language models (LLMs);

a system for generating synthetic data;

a system incorporating one or more virtual machines (VMs);

a system implemented at least partially in a data center; or a system implemented at least partially using cloud computing resources.

20. The one or more processors of claim 18, wherein at least one of:

the class group from the one or more class groups is determined based at least on the class group being associated with a highest probability from one or more first probabilities associated with the one or more class groups; or the object classification from the one or more object classification is determined based at least on the object classification being associated with a highest probability from one or more second probabilities associated with the one or more object classifications.

* * * * *